US008869472B2

(12) United States Patent
Anderson et al.

(10) Patent No.: US 8,869,472 B2
(45) Date of Patent: Oct. 28, 2014

(54) THERMAL GROWTH COMPENSATORS, SYSTEMS, AND METHODS

(71) Applicant: Panelclaw, Inc., North Andover, MA (US)

(72) Inventors: David Anderson, Wellesley, MA (US); Vasilije Jovanovic, Winchester, MA (US)

(73) Assignee: Panelclaw, Inc., North Andover, MA (US)

( * ) Notice: Subject to any disclaimer, the term of this patent is extended or adjusted under 35 U.S.C. 154(b) by 0 days.

(21) Appl. No.: 14/086,524

(22) Filed: Nov. 21, 2013

(65) Prior Publication Data

US 2014/0076834 A1    Mar. 20, 2014

Related U.S. Application Data

(63) Continuation of application No. 13/656,090, filed on Oct. 19, 2012, now Pat. No. 8,607,513.

(60) Provisional application No. 61/581,894, filed on Dec. 30, 2011.

(51) Int. Cl.
*E04D 13/18* (2014.01)
*F24J 2/52* (2006.01)
*F24J 2/46* (2006.01)

(52) U.S. Cl.
CPC .. *F24J 2/52* (2013.01); *Y02B 10/12* (2013.01); *F24J 2/4636* (2013.01); *Y02B 10/20* (2013.01); *Y02E 10/47* (2013.01); *F24J 2/5239* (2013.01)
USPC .......................................... 52/173.3

(58) Field of Classification Search
CPC ......... F24J 2/5203; F24J 2/523; F24J 2/5232; F24J 2/5233; F24J 2/4636; Y02E 10/47
USPC .......... 52/1, 173.3, 573.1; 136/244, 245, 251; 126/623; 285/187, 381.1
See application file for complete search history.

(56) References Cited

U.S. PATENT DOCUMENTS 3,077,958 A    2/1963  Grimsey, Jr.
3,528,206 A    9/1970  Baird
(Continued)

FOREIGN PATENT DOCUMENTS

DE    27 58 067    12/1977
EP    0 344 523 B2    12/1989
WO    WO-94/00650    1/1994

OTHER PUBLICATIONS http://www.engin.brown.edu/organizations/EWB/GISP/Callster%20-%20chapter_17.pdf.*

(Continued)

*Primary Examiner* — Christine T Cajilig
(74) *Attorney, Agent, or Firm* — Foley & Lardner LLP; Christopher J. McKenna

(57) ABSTRACT

A thermal compensation apparatus is disclosed including an elongated element extending from a proximal end to a distal end. A length of the elongated element from the proximal end to the distal end decreases in response to an increase in the temperature of the elongated element from a baseline temperature. The length of the elongated element increases in response to a decrease in the temperature of the elongated element from the baseline temperature. In various embodiments, the apparatus may be incorporated in solar module mounting systems.

9 Claims, 20 Drawing Sheets

(56) References Cited

U.S. PATENT DOCUMENTS

| | | | |
|---|---|---|---|
| 3,675,376 | A | 7/1972 | Belew |
| 3,691,712 | A | 9/1972 | Bowling et al. |
| 4,074,473 | A | 2/1978 | Nelson |
| 4,226,256 | A | 10/1980 | Hawley |
| 4,278,277 | A * | 7/1981 | Krijgsman ............... 285/93 |
| 4,371,139 | A | 2/1983 | Clark |
| 4,966,631 | A | 10/1990 | Matlin et al. |
| 5,125,608 | A | 6/1992 | McMaster et al. |
| 5,143,556 | A | 9/1992 | Matlin |
| 5,228,924 | A | 7/1993 | Barker et al. |
| 5,732,802 | A | 3/1998 | Tsukagoshi |
| 6,243,527 | B1 | 6/2001 | Dawson-Elli |
| 6,394,537 | B1 | 5/2002 | Derees |
| 6,453,092 | B1 | 9/2002 | Trentelman |
| 6,554,244 | B1 | 4/2003 | Graffenried et al. |
| 6,598,361 | B2 | 7/2003 | Ting |
| 7,987,639 | B2 | 8/2011 | Christopoulos et al. |
| 8,276,330 | B2 | 10/2012 | Harberts et al. |
| 2003/0026534 | A1 | 2/2003 | Skull et al. |
| 2004/0101394 | A1 | 5/2004 | Kang |
| 2009/0095285 | A1 | 4/2009 | Klein |
| 2010/0252030 | A1 | 10/2010 | Marcotte et al. |
| 2010/0288337 | A1 | 11/2010 | Rizzo |
| 2012/0048351 | A1 | 3/2012 | Rizzo |
| 2012/0266944 | A1 | 10/2012 | Wildes |
| 2012/0273031 | A1 | 11/2012 | Sagayama |
| 2012/0317888 | A1 | 12/2012 | John |

OTHER PUBLICATIONS

Chevalier, H.L. and Norton, D.J.; Wind Loads on Solar-Collector Panels and Support Structure; Texas A&M University—Aerospace Engineering Department; Oct. 1979.

Cochran, Leighton S.; Influence of Porosity on the Mean and Peak Wind Loads for Three Concentrator Photovoltaix Arrays; Thesis for the Degree of Master of Science Colorado State University; Fall 1986.

Development of a Flat Roof Integrated Photovoltaic System (SOFREL); Phase 1 Report of the SOFREL R&D project; Mar. 1994.

Farrington, Robert; Building Integrated Photovoltaics; National Renewable Energy Laboratory Technical Monitor; Jan. 1993.

Fuentes, Martin K.; A Simplified Thermal Model for Flat-Plate Photovoltaic Arrays; Sandia Report, May 1987.

International Search Report issued May 23, 2013 in PCT Application No. PCT/US2012/072098.

Kern, Jr., Edward C.; Low-cost PV Array Mounting for Flat-Roof Buildings; Third International Workshop on Photovoltaics in Buildings, Sep. 1994.

Notice of Allowance for U.S. Appl. No. 13/656,090 dated Aug. 16, 2013.

Peterka, J.A. et al.; Mean Wind Forces on Parabolic-Trough Solar Collectors; Sandia National Laboratories—Colorado State University; May 1980.

Report to US Deparment of Energy Office Building Technologies: Building Integrated Photovoltaics (BIVP)—Analysis and US Market Potential; Feb. 1995.

Russell Miles C. and Kern, Jr., Edward C.; PV Array Designes for Flat-Roof Buildings; 1993 IEEE.

Stafford, Byron; Design Considerations and Performance of Maspeth a-Si PV System; 1994 American Institute of Physics.

US Office Action for U.S. Appl. No. 13/656,090 dated Mar. 20, 2013.

B. Bienkiewicz and R.N. Meroney: "Wind Effects on Roof Ballast Pavers" Journal of Structural Division, American Society of Civil Engineering. Revised Sep. 1986 and again Jun. 1987 (34 pages).

Bhaduri, S. and Murphy, L.M.: "Wind Loading on Solar Collectors" prepared for the U.S. Dept. of Energy for contract No. DE-AC02-83CH10093, Golden, CO., Jun. 1985 (50 pages).

Delmarva Power and Light Co.: Development of a Dispatchable PV Peak Shaving System Prepared for the US Dept of Energy Cooperative Agreement No. DE-FC-93CHI0569. Oct. 1995.

Hersch, Paul; Strawn, Noni; Piekarski, Dick; Cook, Gary: "Photovoltaics for Residential Applications" Technical Information Branch, Solar Energy Research Institute, published Feb. 1984 (23 pages).

Kern, Edward C., Jr. and Russell, Miles C.: Rotating Shadow Band Pyranometer Irradiance Monitoring for Photovoltaic Generation Estimation from the 22nd IEEE Photovoltaic Specialists Conference—1991 vol. 1, Las Vegas, NV (7 pages).

Murphy, L.M.: "Wind Loading on Tracking and Field Mounted Solar Collectors", prepared by Solar Engery Research Institute, Golden, CO. for the U.S. Dept. of Energy, Dec. 1980 (10 pages).

PV Specifications retrieved from the internet by Greg Pearen, Mar. 23, 2001 (11 pages).

Radu, Adrian; Axinte, Elena; and Theohari, Christina: "Steady Wind Pressures on Solar Collectors on Flat-Roofed Buildings" Journal of Wind Engineering and Industrial Aerodynamics, 23 (1986) 249-258 Elevator Science Publishers B.B., Amsterdam (10 pages).

Russell, M.C.: Solar Photovoltaic Systems for Residences in the Northeast, Lexington, MA, 1980 (7 pages).

Russell, Miles C. and Kern, Edward C. Jr.: "Stand-Off Building Block Systems for Roof-Mounted Photovoltaic Arrays Sandia Contract" 58-8796. Retrieved through Wisconsin Tech Search. Jun. 1986 (212 pages).

Siemens Solar Electric Modules Installation Guide, 1990 (8 pages).

Stiebel Eltron GmbH & Co.: KG: "Mount for the installment of Solar Panels" retrieved from German Patent Office, published Aug. 26, 1982 (9 pages).

Technical Information Branch, Solar Energy Research Institute: "Photovoltaics for Residential Applications" operated for the U.S. Dept. of Energy by Midwest Research Institute, Golden, CO, Feb. 1984 (23 pages).

Tieleman, H.W. et al.: "An Investigation of Wind Loads on Solar Collectors" prepared for the U.S. Dept. of Commerce National Bureau of Standards for contract No. EO-A01-78-3605, Jan. 1980 (173 pages).

International Preliminary Report on Patentability for PCT Appl. Ser. No. PCT/US2012/072098 dated Jul. 1, 2014.

* cited by examiner

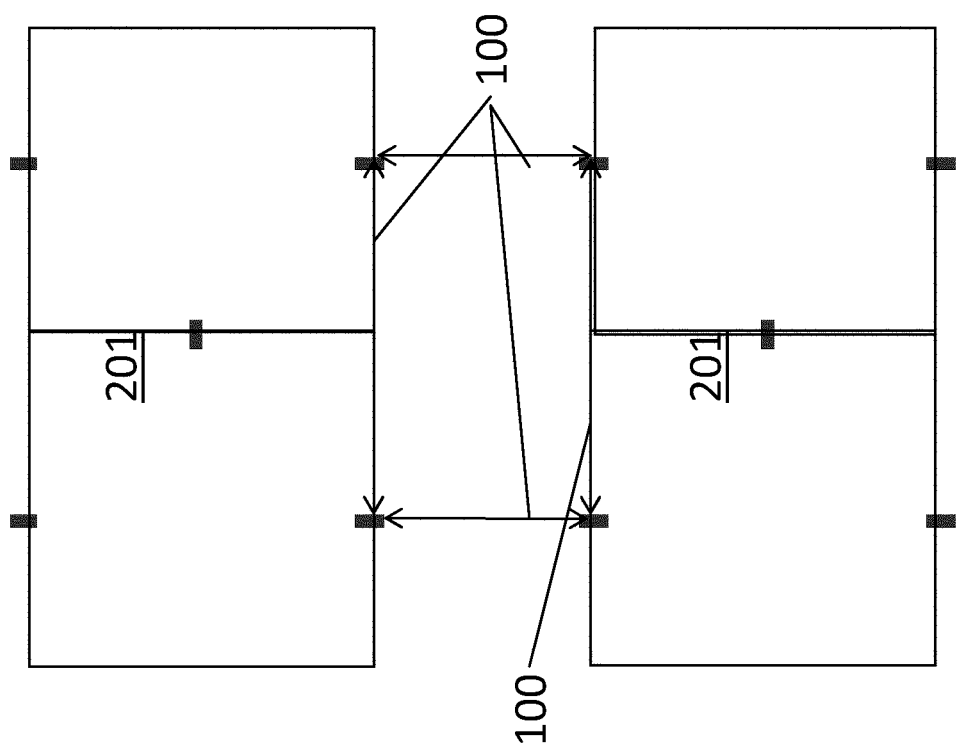

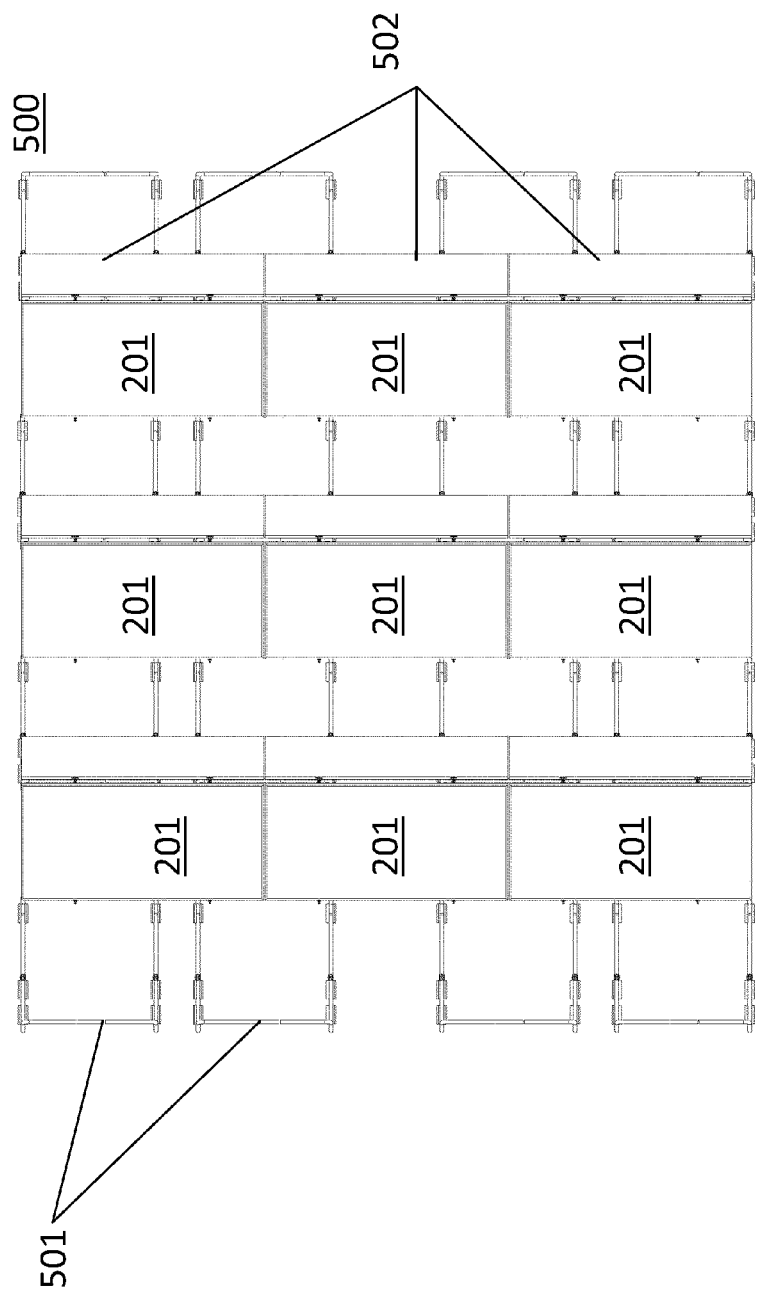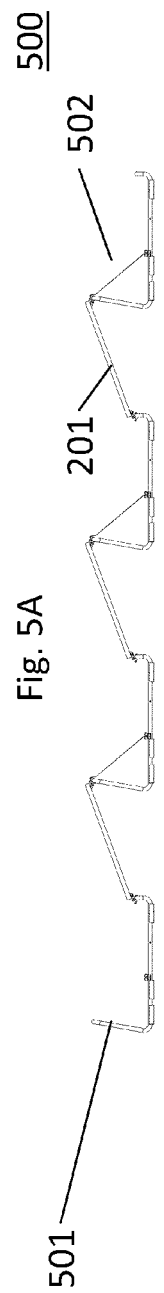
Fig. 5A
Fig. 5B

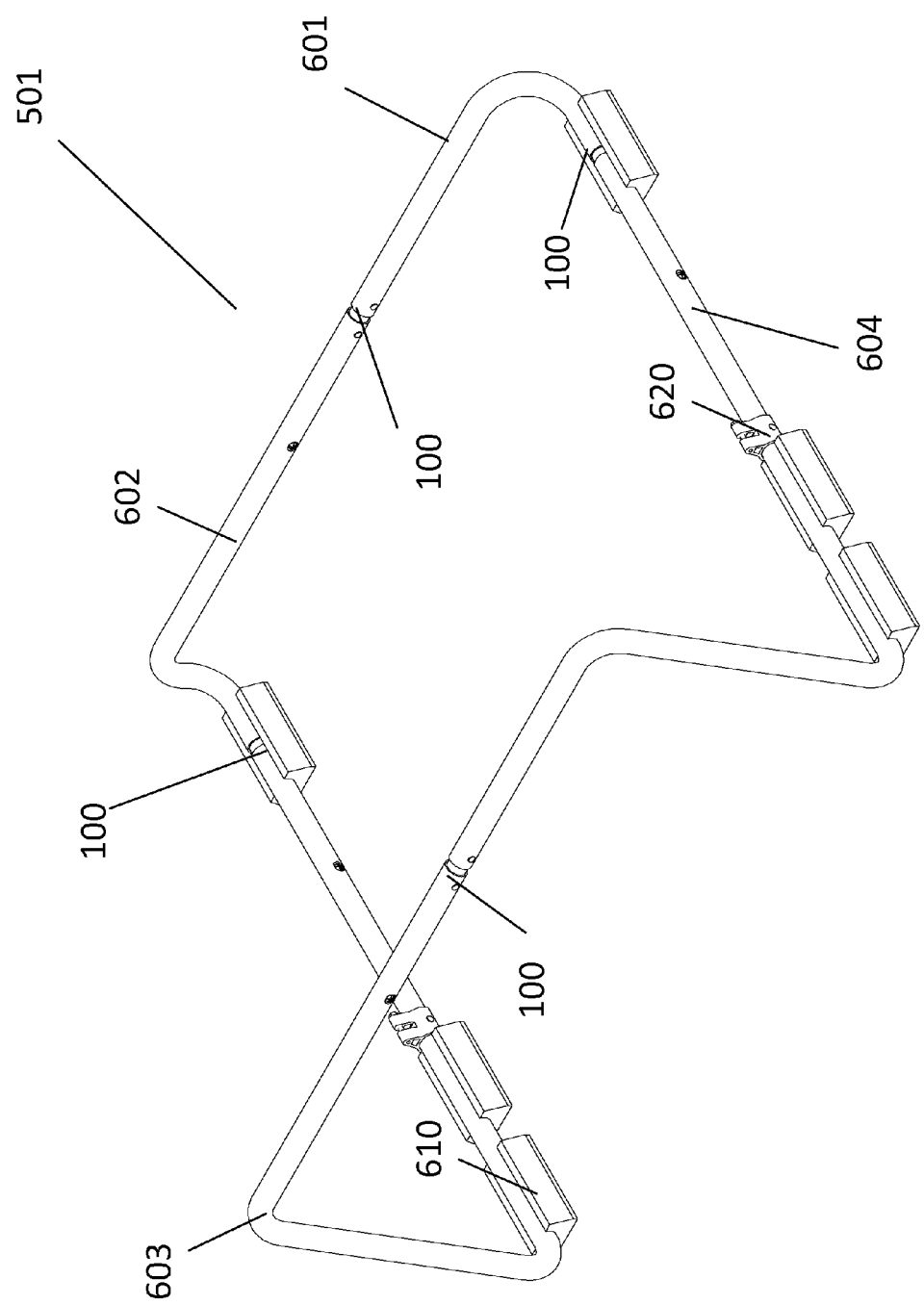

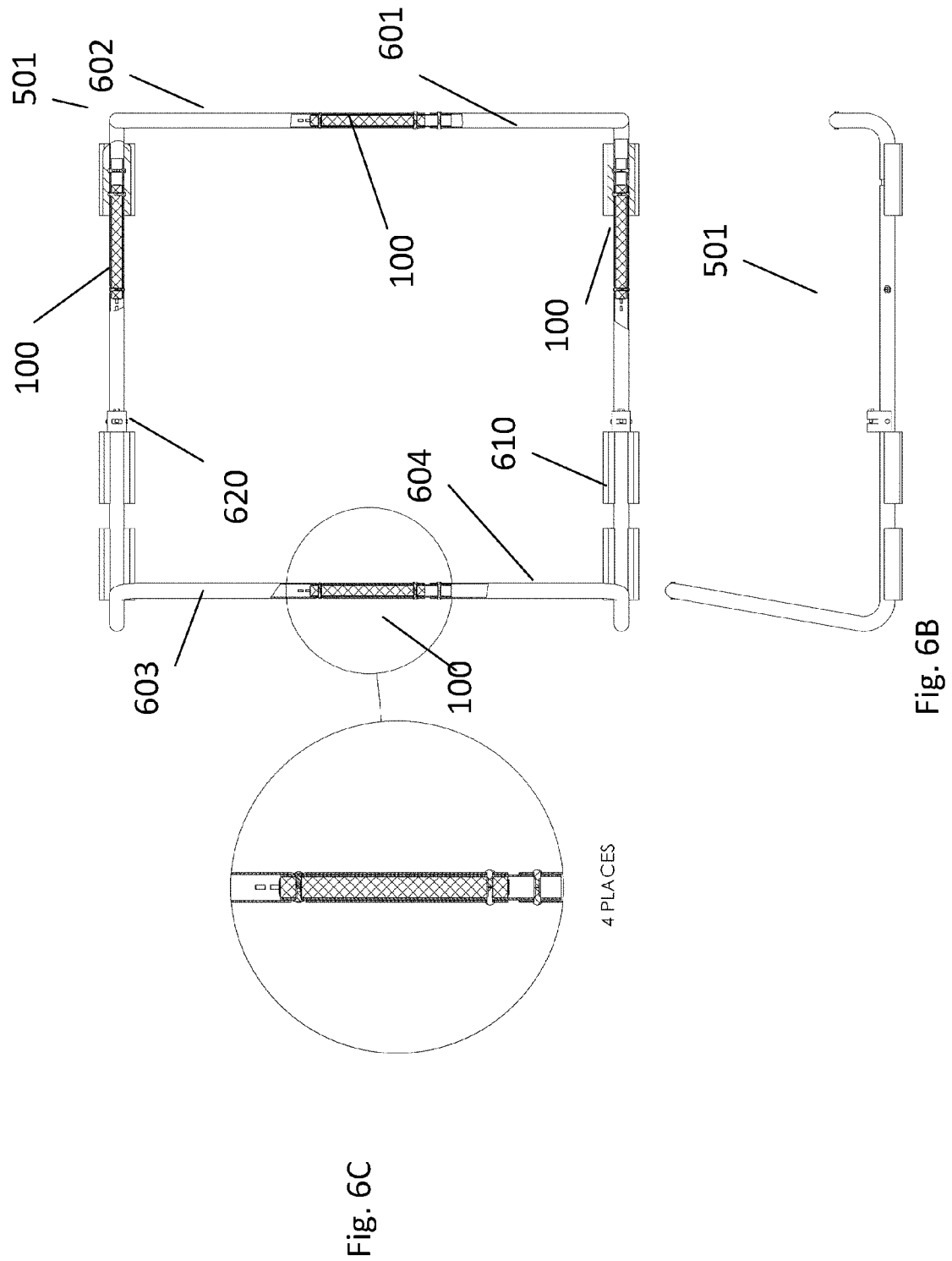

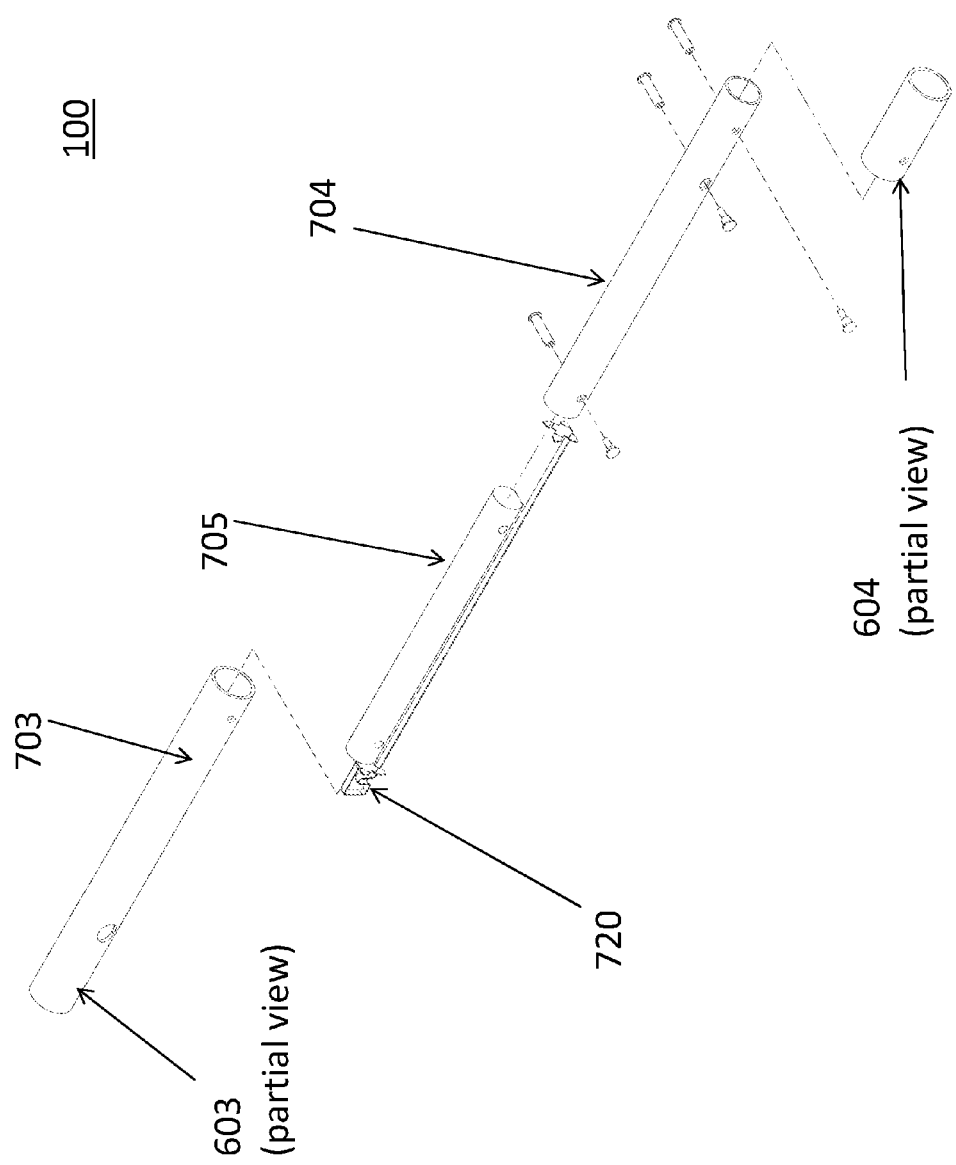

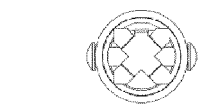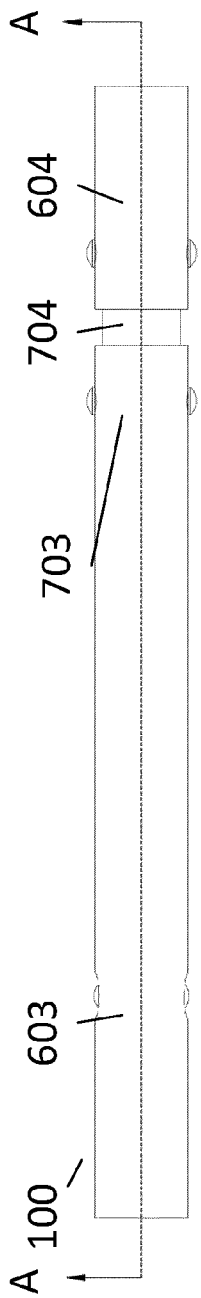
Fig. 7B
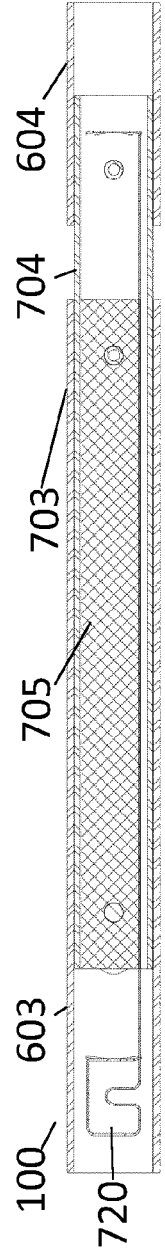
COLD
Fig. 7E
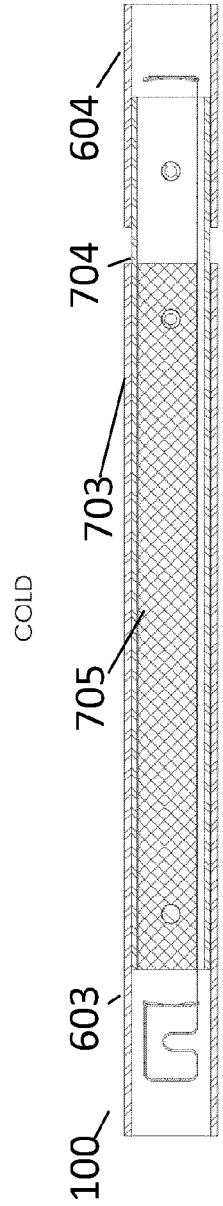
ROOM TEMP
Fig. 7C
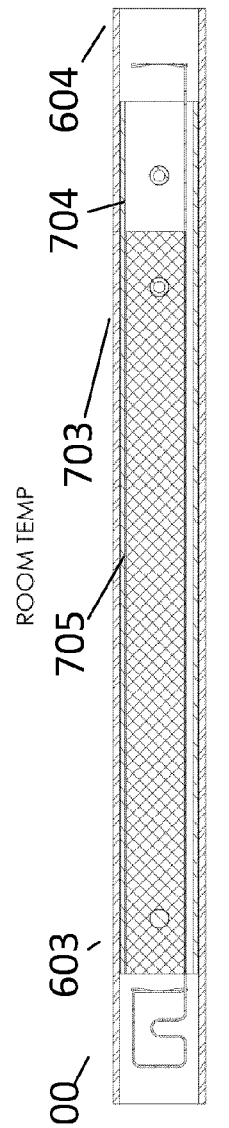
HOT
Fig. 7D

| Thermal Compensator Sizing - Inputs Sheet | | | |
|---|---|---|---|
| Description | Variable | Value | Material |
| CTE - Kodiak Support | CTE1 | 0.0000067 | Steel |
| CTE - Thermal Compensator | CTE2 | 0.000111 | UHMW |
| CTE - panel frame | CTE-p | 0.0000131 | Aluminum |
| Gap between panels | A1 | 0.5 | in |
| Support location (Airy point) | AP | 2/9 | |
| Shading ratio (Y/B1) | SR | 3 | |
| Low Temp | TL | 0 | F |
| High Temp | TH | 180 | F |
| Temp Differential | dT | 180 | F |
| Strain limit | SL | 10% | |

Fig. 8A

| A, B | Ao | X Bo | B1 | Y | X2,Y2 | Direction | Angle α | L1 | L2 | L3 | L4 |
|---|---|---|---|---|---|---|---|---|---|---|---|
| | | | | | Distance between holes in athermal module | | | 4.52 | 5.47 | 6.62 | 8.01 |
| | | | | | Growth Change | | | 0.085 | 0.103 | 0.124 | 0.150 |
| | | | | | Lower range of acceptable links | | | 4.07 | 4.92 | 5.96 | 7.21 |
| | | | | | Upper range of acceptable links | | | 4.97 | 6.02 | 7.28 | 8.81 |
| 60 | 33.33 | 27.17 | | | 5.93 | E-W | | | | | |
| 61 | 33.89 | 27.61 | | | 6.03 | E-W | | | | L3 | |
| 62 | 34.44 | 28.06 | | | 6.13 | E-W | | | | L3 | |
| 63 | 35.00 | 28.50 | | | 6.23 | E-W | | | | L3 | |
| 64 | 35.56 | 28.94 | | | 6.33 | E-W | | | | L3 | |
| 65 | 36.11 | 29.39 | | | 6.42 | E-W | | | | L3 | |
| 66 | 36.67 | 29.83 | | | 6.52 | E-W | | | | L3 | |
| 67 | 37.22 | 30.28 | | | 6.62 | E-W | | | | L3 | |
| 68 | 37.78 | 30.72 | | | 6.72 | E-W | | | | L3 | |
| 69 | 38.33 | 31.17 | | | 6.82 | E-W | | | | L3 | |
| 70 | 38.89 | 31.61 | | | 6.92 | E-W | | | | L3 | |
| 71 | 39.44 | 32.06 | | | 7.01 | E-W | | | | L3 | |
| 72 | 40.00 | 32.50 | | | 7.11 | E-W | | | | L3 | |
| 73 | 40.56 | 32.94 | | | 7.21 | E-W | | | | L3 | |
| 74 | 41.11 | 33.39 | | | 7.31 | E-W | | | | | L4 |
| 75 | 41.67 | 33.83 | | | 7.41 | E-W | | | | | L4 |
| 76 | 42.22 | 34.28 | | | 7.51 | E-W | | | | | L4 |
| 77 | 42.78 | 34.72 | | | 7.60 | E-W | | | | | L4 |
| 78 | 43.33 | 35.17 | | | 7.70 | E-W | | | | | L4 |
| 79 | 43.89 | 35.61 | | | 7.80 | E-W | | | | | L4 |
| 80 | 44.44 | 36.06 | | | 7.90 | E-W | | | | | L4 |
| 24 | | | 23.18 | 6.21 | 18.63 | 4.11 | N-S | 15 | L1 | | |
| 25 | | | 24.15 | 6.47 | 19.41 | 4.28 | N-S | 15 | L1 | | |
| 26 | | | 25.11 | 6.73 | 20.19 | 4.45 | N-S | 15 | L1 | | |
| 27 | | | 26.08 | 6.99 | 20.96 | 4.62 | N-S | 15 | L1 | | |
| 28 | | | 27.05 | 7.25 | 21.74 | 4.79 | N-S | 15 | L1 | | |
| 29 | | | 28.01 | 7.51 | 22.52 | 4.96 | N-S | 15 | | L2 | |
| 30 | | | 28.98 | 7.76 | 23.29 | 5.14 | N-S | 15 | | L2 | |

Fig. 8B

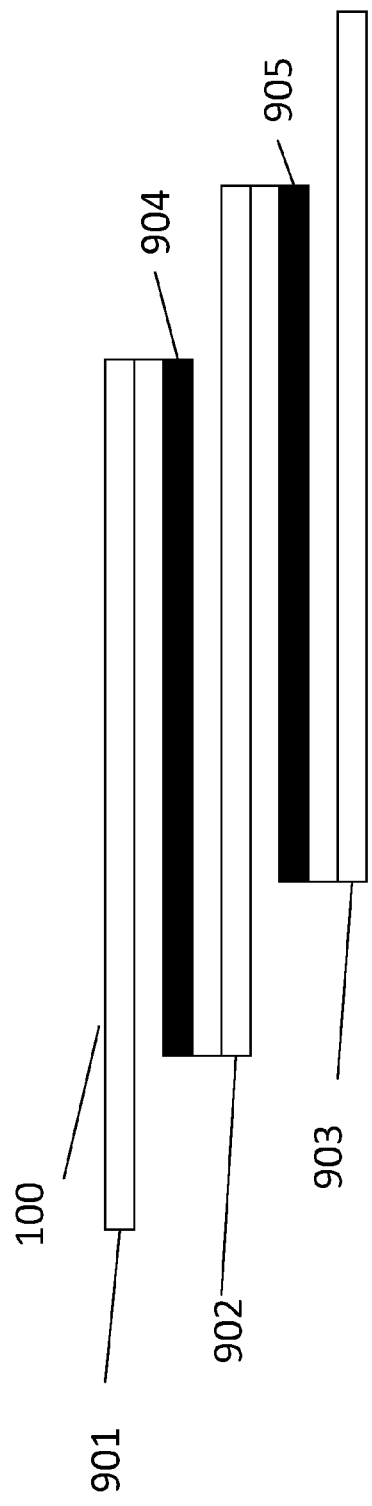
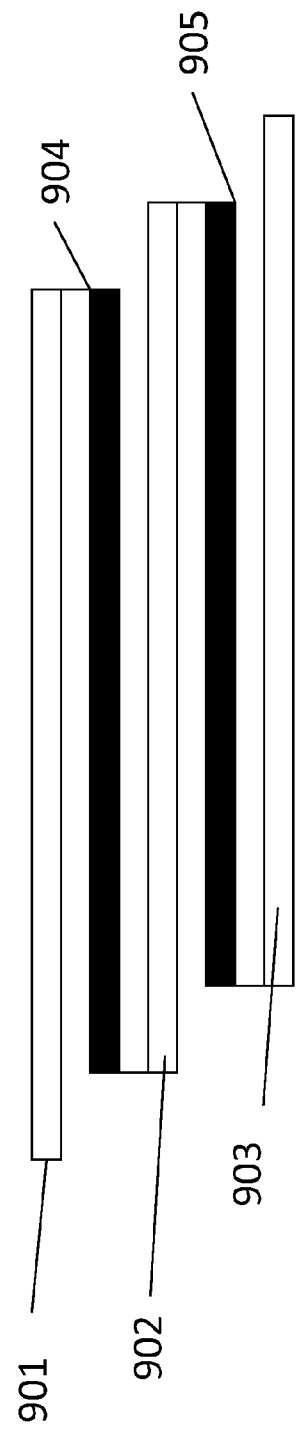
Fig. 9A
Fig. 9B

THERMAL GROWTH COMPENSATORS, SYSTEMS, AND METHODS

CROSS REFERENCE TO RELATED APPLICATIONS

The current application is a continuation of U.S. patent application Ser. No. 13/656,090, filed Oct. 19, 2012, which claims the benefit of U.S. Provisional Application No. 61/581,894 filed Dec. 30, 2011 and is related to U.S. Provisional Patent Application Ser. No. 61/229,622 filed Jul. 29, 2009; U.S. Provisional Patent Application Ser. No. 61/506,490 filed Jul. 11, 2011; U.S. patent application Ser. No. 12/056,791 filed Mar. 27, 2008; U.S. patent application Ser. No. 12/846,259 filed Jul. 29, 2010; and U.S. Provisional Patent Application Ser. No. 61/506,490 filed Jul. 11, 2011, the entire contents of each of which are incorporated herein by reference.

BACKGROUND

Some embodiments disclosed herein are directed to systems, devices, and methods for mounting and retaining solar modules.

Solar (e.g., photovoltaic) modules are often manufactured in the form of flat rigid structures. To facilitate the performance of the function of generating electricity, solar modules may be mounted in an area exposed to the sun or other source of light. Often, it is desirable to mount solar modules outdoors at an angle from the horizontal so that they will more directly face the sun during peak daylight hours as opposed to modules mounted horizontally. In some applications, it may be desirable to mount a number of solar modules together in an array in order to combine the power generation capabilities of the individual modules. In many instances, it may be desirable that mounting systems for solar module arrays retain the solar modules in place. This may be accomplished by attaching the solar modules to one another in a mounting system and/or by mounting the modules to the mounting system.

For example, U.S. Patent Application Publication No. 2007/0133474 to Mascolo et al. describes a supported solar module assembly including a solar module comprising a solar module and solar module supports including module supports having support surfaces supporting the module, a module registration member engaging the solar module to position the solar module on the module support, and a mounting element. U.S. Pat. No. 6,534,703 to Dinwoodie describes a solar module assembly for use on a support surface comprising a base, a solar module, a multi-position module support assembly, and a deflector.

Solar module assemblies are typically subjected to thermal stress. Thermal stress is a mechanical stress induced in a body when some or all of its parts are not free to expand or contract in response to changes in temperature. For example, on solar module arrays, thermal stresses may generate forces on the modules and the mounting system retaining the modules. In some cases, these forces may cause the modules and/or mounting system to rotate, translate, or otherwise move relative to the underlying surface (e.g., a rooftop). In some cases, thermal expansion and contraction may slide entire solar module arrays across the roof, potentially damaging the roof surface, the mounting system, the modules, etc. Thermal expansion and contraction cycling may result in premature solar module failures, mounting system failures, etc.

SUMMARY

The applicants have developed devices, systems, and methods as described herein that compensate for thermal expansion and contraction, and can be used to reduce or eliminate thermal stresses in a system such as a solar array. Such reduction or elimination is referred to herein as "athermalization".

In one aspect, a thermal compensation apparatus is disclosed that can be used, e.g., as a mechanical linkage between objects. The thermal compensation apparatus is designed to decrease in length when heated, and increase in length when cooled. This is the opposite of conventional materials, where heating typically causes expansion, while cooling causes contraction. Accordingly, the thermal compensation apparatus can be paired with conventional objects to accommodate and cancel out thermal motion, thereby reducing or eliminating thermal stress. As detailed below, such devices may be used in solar module mounting systems to provide athermalization of the system.

In one aspect, a thermal compensation apparatus is disclosed including: an elongated element extending from a proximal end to a distal end. A length of the elongated element from the proximal end to the distal end decreases in response to an increase in the temperature of the elongated element from a baseline temperature; and the length of the elongated element increases in response to a decrease in the temperature of the elongated element from the baseline temperature.

In some embodiments, the elongated element includes: a central portion extending from a first end located towards the proximal end of the elongated element and a second end towards the distal end of the elongated element; a proximal portion extending from a first end at the proximal end of the elongated element to a second end connected to the second end of the central portion; and a distal portion extending from a first end at the distal end of the elongated element to a second end connected to the first end of the central portion.

In some embodiments, the coefficient of thermal expansion (CTE) of the central portion is greater than the CTE of the proximal portion and the CTE of the distal portion, such that: in response to an increase in the temperature of the elongated element from a baseline temperature, the proximal end of the elongated element moves towards the distal end of the elongated element; and in response to a decrease in the temperature of the elongated element from a baseline temperature, the proximal end of the elongated element moves away from the distal end of the elongated element.

In some embodiments, substantially all of the movement of the ends of the elongated element is due to thermal expansion or contraction of the central, distal, and proximal portions.

In some embodiments, the proximal portion includes a tubular member disposed at least partially about the central portion.

In some embodiments, the central portion includes a tubular member disposed at least partially about the distal portion.

In some embodiments, the proximal and distal portions include a metallic material, and the central portion includes a non-metallic material.

In some embodiments, the CTE of the central portion is many times the CTE of the proximal portion and at least about 5 times the CTE of the distal portion.

Some embodiments include at least one grounding link that establishes an electrical contact between the distal end and the proximal end of the elongated member.

In some embodiments, the elongated member is substantially rigid.

In another aspect, a solar module mounting system for mounting a plurality of solar modules is disclosed, the system including: a plurality of mounts each configured for attachment to one or more of the solar modules to at least partially support the one or more modules; and a plurality of crosslinks where: each crosslink is configured for attachment between two of the plurality of solar modules, and each crosslink includes a thermal compensation apparatus of any of the types described above.

In some embodiments, each crosslink is configured for attachment to an edge of a solar module at an Airy point of the edge.

In some embodiments, the solar modules are rectangular in shape, and the mounting system is configured to arrange the modules in a rectangular array having a first array direction corresponding to a first edge of the modules, and a second array direction substantially perpendicular to the first array direction. In some embodiments, each edge of each module is attached to at least one of the crosslinks, where the crosslink extends to the edge of another module along a direction transverse to the first and second array directions.

In some embodiments, the solar modules are rectangular in shape, and the mounting system is configured to arrange the modules in a rectangular array having a first array direction corresponding to a first edge of the modules, and a second array direction substantially perpendicular to the first array direction. In some embodiments, each edge of each module is attached to at least a pair of the crosslinks, where the first crosslink in the pair extends to the edge of another module along a direction parallel to the first array direction; and the second crosslink in the pair extends to the edge of another module along a direction parallel to the second array direction.

In some embodiments, the crosslinks are configured to substantially compensate for thermal stress caused by thermal expansion and contraction of the solar modules over a temperature range.

In some embodiments, the temperature range includes −40 C to 85 C C or any subrange thereof.

In another aspect, a solar module mount is disclosed including: a support frame for supporting a solar module, the frame including one or more thermal compensation elements including a thermal compensation apparatus of any of the types described above.

In some embodiments, the thermal compensation elements include a first thermal compensation element configured to compensate for thermal expansion and contraction along a first direction, and a second thermal compensation element configured to compensate for thermal expansion and contraction along a second direction transverse to the first.

Some embodiments include, a first pair of substantially parallel elongated elements configured to rest against a surface, each element in the pair including at least one of the thermal compensation element; and a second pair of elongated elements each configured for attachment to a solar module, the second pair arranged substantially parallel to each other and substantially perpendicular to the first pair.

In some embodiments, each of the second pair of elongated elements is arranged at a different height above the surface.

In some embodiments, a method is disclosed including: obtaining a thermal compensation apparatus of any of the types described above; attaching the thermal compensation apparatus to at least one object subject to thermal expansion or contraction; and compensating for thermal expansion in the object using a corresponding thermal contraction in the thermal compensation apparatus; or compensating for thermal contraction in the object using a corresponding thermal expansion in the thermal compensation apparatus.

In some embodiments, compensating for thermal expansion or contraction includes reducing stress or strain on the object due to thermal expansion or contraction.

In some embodiments, reducing stress or strain on the object due to thermal expansion or contraction includes substantially eliminating stress or strain on the object due to thermal expansion or contraction.

Some embodiments include selecting a CTE of at least one component of the thermal compensation apparatus based on one or more physical properties of the object.

In some embodiments, the physical property includes at least one from the list consisting of: size, shape, and CTE.

In some embodiments, the object includes a solar module or a component of a solar module mounting system.

In another aspect, a method of mounting solar modules is disclosed, the method including: obtaining a solar module mounting system for mounting a plurality of solar modules including: a plurality of mounts each configured for attachment to one or more of the solar modules to at least partially support the one or more modules; and a plurality of crosslinks where: each crosslink is configured for attachment between two of the plurality of solar modules, and each crosslink includes the thermal compensation apparatus of any of the types described above; and mounting the solar modules using the mounting system.

Some embodiments include attaching each crosslink to an edge of a solar module at an Airy point of the edge.

In some embodiments, the solar modules are rectangular in shape, and mounting the solar modules includes: arranging the modules in a rectangular array having a first array direction corresponding to a first edge of the modules, and a second array direction substantially perpendicular to the first array direction; and attaching each edge of each module to at least one of the crosslinks, where the crosslink extends to the edge of another module along a direction transverse to the first and second array directions.

In some embodiments, the solar modules are rectangular in shape, and mounting the solar modules includes: arranging the modules in a rectangular array having a first array direction corresponding to a first edge of the modules, and a second array direction substantially perpendicular to the first array direction; and attaching each edge of each module to at least a pair of the crosslinks. In some embodiments, the first crosslink in the pair extends to the edge of another module along a direction parallel to the first array direction; and the second crosslink in the pair extends to the edge of another module along a direction parallel to the second array direction.

Some embodiments include using the crosslinks to substantially compensate for thermal stress caused by thermal expansion and contraction of the solar modules over a temperature range.

In some embodiments, the temperature range includes −20-40 C to 85 C or any subrange thereof.

In another aspect, a method is disclosed including: obtaining a support frame for supporting a solar module, the frame including one or more thermal compensation elements including the thermal compensation apparatus of any one of the types described above; and attaching at least one solar module to the support frame.

Some embodiments include using a first thermal compensation element configured to compensate for thermal expansion and contraction along a first direction, and using a second thermal compensation element configured to compensate for thermal expansion and contraction along a second direction transverse to the first.

In various embodiments, any of the above described devices, techniques, systems, elements, steps, etc. may be used, either alone, or in any suitable combination.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

FIG. 4 is a schematic of another embodiment of a solar module mounting system featuring thermal growth compensators shown in a top down view.

FIG. 5A shows a top down view of a solar module mounting system featuring thermal growth compensators integrated in support frames.

FIG. 5B shows a side view of a solar module mounting system featuring thermal growth compensators integrated in support frames.

FIG. 6A shows a perspective view of a support frame from the solar module mounting system of FIGS. 5A and 5B.

FIG. 6B shows a side view of a support frame from the solar module mounting system of FIGS. 5A and 5B.

FIG. 6C shows a top down view of a support frame from the solar module mounting system of FIGS. 5A and 5B. An inset shows a detailed view of a thermal growth compensator included in the support frame.

FIG. 7A is an exploded view of a thermal growth compensator (TGC) included in the support frame shown in FIGS. 6A-6C.

FIG. 7B shows a side view of a thermal growth compensator included in the support frame shown in FIGS. 6A-6C. Head on views are shown in insets to the left and the right of the side view.

FIG. 7C is a cross sectional of the thermal growth compensator of FIG. 6B view taken along the section AA. The compensation device is at a baseline temperature.

FIG. 7D is a cross sectional of the thermal growth compensator of FIG. 6B view taken along the section AA. The thermal growth compensator is at a temperature warmer than the baseline temperature.

FIG. 7E is a cross sectional of the thermal growth compensator of FIG. 6B view taken along the section AA. The thermal growth compensator is at a temperature colder than the baseline temperature.

FIGS. 8A-8C illustrate a method of choosing suitable designs for the thermal growth compensators in an exemplary embodiment of the mounting system shown in FIGS. 5A-7E. FIG. 8A shows a table of input parameters characterizing the system. FIG. 8B is a look up table which provides suitable design parameters for the thermal growth compensators. FIG. 8C is a schematic illustrating the correspondence of parameter labels from FIGS. 8A and 8B to aspects of the mounting system and corresponding array of modules.

FIG. 9A is a schematic of an alternate embodiment of a thermal growth compensator at a baseline temperature.

FIG. 9B is a schematic of the thermal growth compensator of FIG. 9A at a temperature warmer than the baseline temperature.

DETAILED DESCRIPTION

Figure 1A:
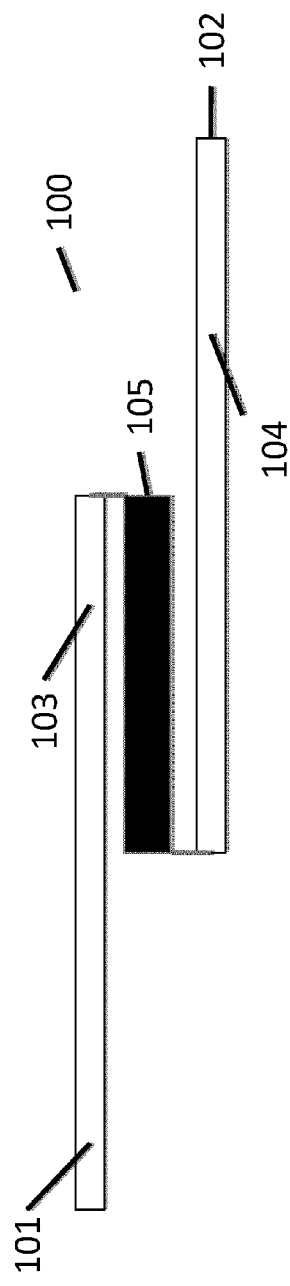
FIG. 1A is a schematic of a thermal growth compensator at a baseline temperature.

FIG. 1A shows a thermal growth compensator 100 at a baseline temperate. The thermal growth compensator 100 extends from a left end 101 to a right end 102. The thermal growth compensator 100 includes a left portion 103, a right portion 104, and a central portion 105. The right end of the left portion 103 is connected to the right end of the central portion 105. The left end of the right portion 104 is attached to the left end of the central portion 105. The central portion, 105 is made of a material which differs from the material of the left and right portions 103, 104, such that the coefficient of thermal expansion (CTE) of the central portion 105 is greater than the coefficient of thermal expansion of the left and right portions 103, 104. For example, in various embodiments, the CTE of the central portion 105 may be at least 2, at least 3, at least 4, at least 5, or more times the CTE of either of the left and right portions 103, 104. For example in various embodiments, the CTE of the central portion 105 may be in the range of 2-100 times the CTE of either of the left and right portions 103, 104, or any subrange thereof.

Figure 1B:
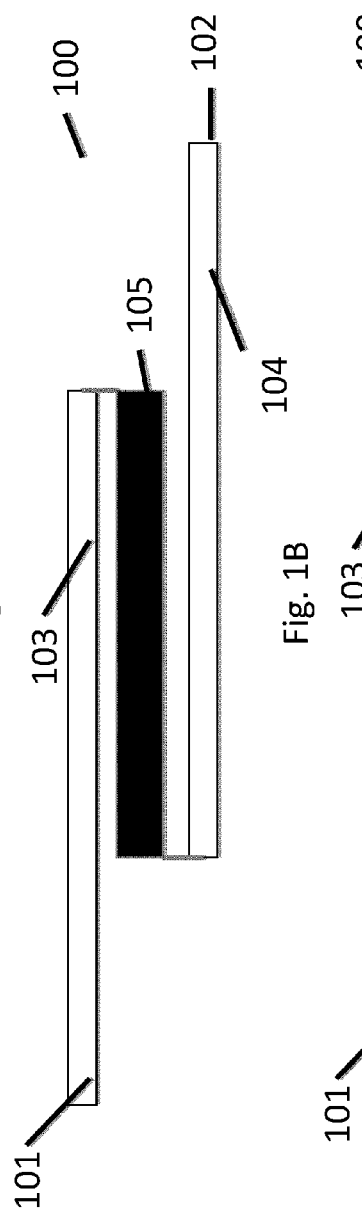
FIG. 1B is a schematic of the thermal growth compensator of FIG. 1A at a temperature warmer than the baseline temperature.

FIG. 1B shows a thermal growth compensator 100 at a temperature greater than the baseline temperature. Each of the left, right, and central portions 103, 104, 105 expand in response to the temperature increase. However, because the CTE of the central portion 105 is greater than that of the other portions 103, 104, the left and right ends 101 and 102 of the thermal growth compensator 100 move towards each other, thereby reducing the overall length of the device along the direction between the ends 101 and 102.

Figure 1C:
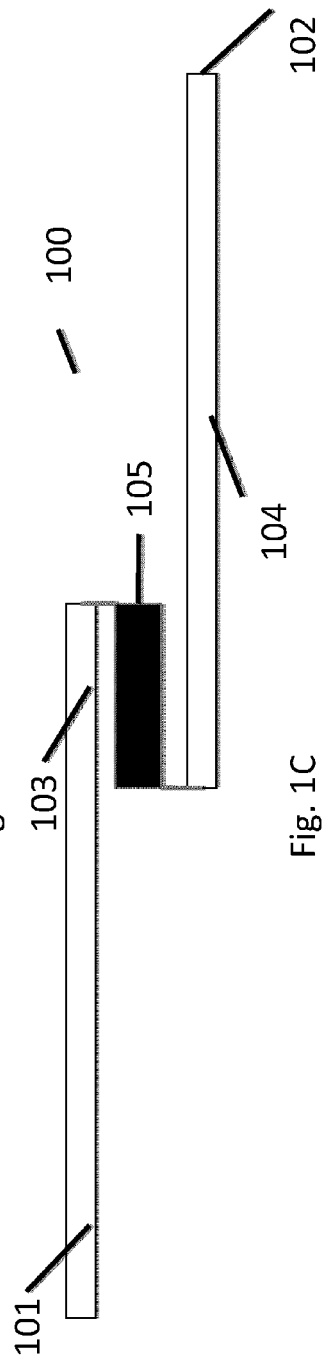
FIG. 1C is a schematic of the thermal growth compensator of FIG. 1A at a temperature colder than the baseline temperature.

FIG. 1C shows a thermal growth compensator 100 at a temperature less than the baseline temperature. Each of the left, right, and central portions 103, 104, 105 contract in response to the temperature decrease. However, because the CTE of the central portion 105 is greater than that of the other portions 103, 104, the left and right ends 101 and 102 of the thermal growth compensator 100 move away from each other, thereby increasing the overall length of the device along the direction between the ends 101 and 102.

Accordingly, the thermal growth compensator 100 exhibits thermal expansion and contraction in the direction opposite of that of normal materials. That is, the length of the thermal growth compensator 100 decreases with increasing temperature and increases with decreasing temperature. In various embodiments (e.g., as given in the examples below), this behavior may be used to compensate for thermal expansion and contraction of various objects. For example, the thermal growth compensator 100 may be used as a mechanical link between two objects. The thermal expansion/contraction of the thermal growth compensator 100 can work in the opposite sense of the thermal expansion/contraction of the objects. Accordingly, the thermal growth compensator 100 may reduce or eliminate the thermal stress and/or strain on the overall system thereby providing thermal compensation.

In contrast, a conventional rigid link between the objects would not provide thermal compensation. Rather, a conventional link would expand and contract in the same sense as the objects, exacerbating the problem of thermal stress and strain.

In various embodiments, the compensation provided by the thermal growth compensator 100 can be "tuned" by suitable choice of the materials, sizes, and arrangement of the portions 103, 104, 105. That is, the thermal expansion/contraction properties of the thermal growth compensator 100 can be adjusted based on the known properties (size, shape, CTE, etc.) of an attached object or objects to provide a desired level of thermal compensation. The overall CTE of the compensator may be tuned to be positive, negative, or zero, by suitable choice of material, geometry, etc.

Note that in various embodiments, the thermal growth compensator 100 provides passive compensation. That is, suitable compensation is provided by matching the properties of the thermal growth compensator 100 to that of the attached object or objects. No dynamic monitoring (e.g., using temperature or other sensors) or adjustment (e.g., using one or more actuators) is required. Moreover, in various embodiments, the thermal growth compensator 100 may be rigid, or substantially rigid, providing thermal compensation without the need for flexible elastomeric elements (e.g., expansion joints featuring flexible members familiar from the use in construction and plumbing applications).

In some embodiments, the left and right portions 103, 104 may be made of a metallic material, such as aluminum, steel (e.g., cold rolled low carbon steel), etc. In some embodiments, the central portion 105 may be made of a non-metallic material such as a plastic, a polymer, etc. In some embodiments, the central portion may be made of a metallic material having a CTE different from that of the left and right portions 103, 104 (e.g., as described in greater detail below). In various embodiments, any suitable materials may be used.

Note that for some applications, it may be desirable to use a material for the central portion that has a CTE less than the CTE of the left and right portions 103, 104.

In various embodiments, materials exhibiting a negative CTE over at least some temperatures (e.g., quartz or cubic zirconium tungstate) may be used.

Figure 2A:
FIG. 2A is schematic of a tubular thermal growth compensator shown in cross section.

FIG. 2A shows another embodiments of the thermal growth compensator 100. As shown, the left and right portions 103, 104 are metal tubes. The central portion 105 is a plastic tube. The left portion 103 is disposed about the central portion 105, with the right end of the left portion 103 attached to the right end of the central portion 105. The central portion 105 is disposed about at least part of the right portion 104. The left end of the right portion 104 is attached to the left end of the central portion 105.

As was the case in the embodiments shown in FIGS. 1A-1C, the central portion 105 is made of a material which differs from the material of the left and right portions 103, 104, such that the CTE of the central portion 105 is greater than the coefficient of thermal expansion of the left and right portions 103, 104. As the temperature of the thermal growth compensator 100 increases, the central portion expands at a faster rate than the left and right portions 103, 104, causing the left and right ends 101, 102 of the thermal growth compensator 100 move towards each other, thereby reducing the overall length of the device along the direction between the ends 101, 102. That is, with increasing temperature, the nested tubular structure of the thermal growth compensator 100 "telescopes" in on itself, to reduce the total length of the device between the ends 101 and 102.

As the temperature of the thermal growth compensator 100 decreases, the central portion contracts at a faster rate than the left and right portions 103, 104, causing the left and right ends 101 and 102 of the thermal growth compensator 100 move away each other, thereby increasing the overall length of the device along the direction between the ends 101, 102. That is, with decreasing temperature, the nested tubular structure of the thermal growth compensator 100 "telescopes" out, to increase the total length of the device between the ends 101, 102.

Figure 2B:
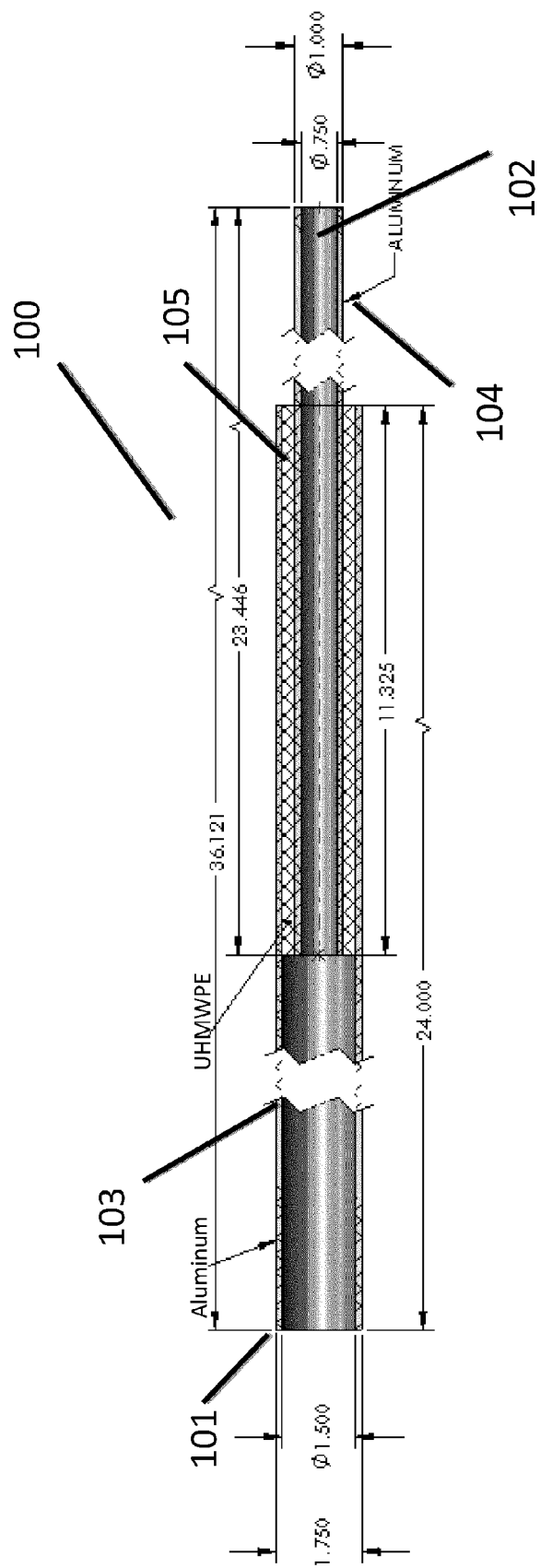
FIG. 2B is schematic of a tubular thermal growth compensator shown in cross section, with exemplary dimensions in arbitrary units and exemplary material choices.

FIG. 2B shows a dimensional drawing of an embodiments of a thermal growth compensator 100 featuring the nested tubular structure shown in FIG. 2A. Although exemplary dimensions are shown, in various embodiments, other dimensions may be used.

In this embodiment, the left and right portions 103 and 104 are aluminum tubes. The central portion 105 is a tube of ultra high molecular weight polyethylene (UHMW). However, it is to be understood that in various embodiments other materials may be used. For example, the central portion 105 may include any suitable material, including: a plastic, a polymer, polyvinyl carbonate (PVC), polyethylene (PE), high density polyethylene (HDPE), any metal or combination of metals having a CTE other than that of the left and right portions 103 and 104 etc. In various embodiments, the central portion may include a material having a CTE greater than about 10 ppm/F (part per million per degree Fahrenheit), 20 ppm/F 30 ppm/F, 40 ppm/F, 50 ppm/F, 60 ppm/F, 70 ppm/F, 80 ppm/F, 90 ppm/F, 100 ppm/F, or more, e.g., in the range of 50-150 ppm/F, or any subrange thereof.

Table one below shows the CTE for a variety of materials that may be used. The first three entries in the table are for metallic materials. The last four materials are non-metallic materials. Note that the CTE for the listed metallic materials is significantly less than that for the listed non-metallic materials. In various embodiments, the metallic materials are suitable for use in the left and right portions 103 and 104, while the non-metallic materials are suitable for use in the central portion 105.

TABLE ONE

| Material | CTE (inch per inch per degree Fahrenheit) |
| --- | --- |
| Aluminum | $13.1*10^{-6}$ |
| Steel | $6.7*10^{-6}$ |
| 300 Series Stainless steel | $9.6*10^{-6}$ |
| UHMW | $8.37*10^{-5}$ |
| HDPE | $1.25*10^{-4}$ |
| PVC | $0.73*10^{-4}$ |
| PE | $1.24*10^{-4}$ |

Figure 3:
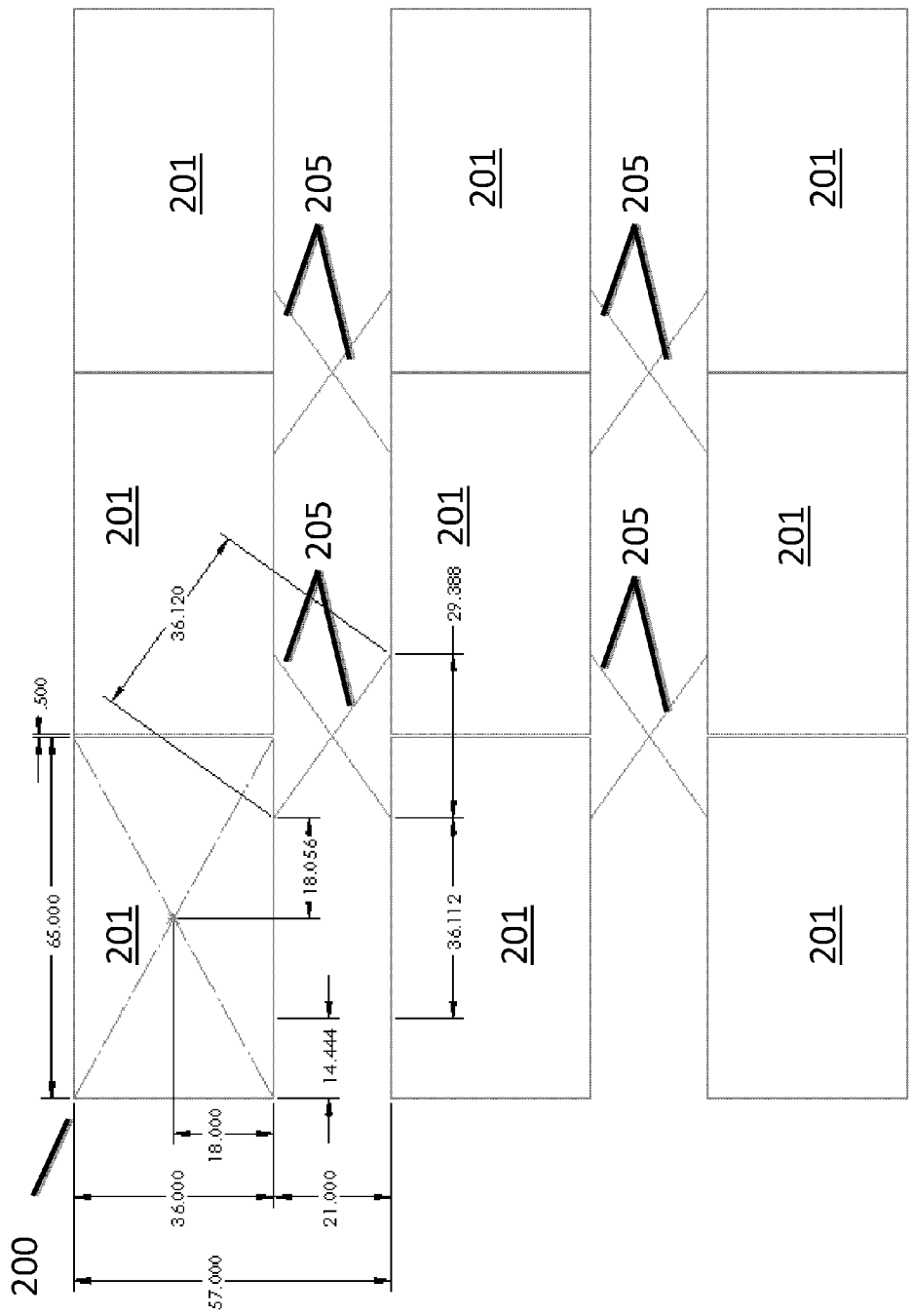
FIG. 3 is a schematic of a solar module mounting system featuring thermal growth compensators shown in a top down view. Exemplary dimensions in arbitrary units are shown.

The thermal growth compensator 100 described herein may be used in a variety of applications. FIG. 3 shows the use of the thermal growth compensator 100 as a crosslink in a solar module mounting system 200. As shown, nine rectangular solar modules 201 are arranged in a rectangular array of three rows of three, however it is to be understood that, in other embodiments, any suitable number and arrangement may be used. The modules 201 are thermally expand and contract about their centers.

In some embodiments, the solar module 201 is a packaged interconnected assembly of solar cells, e.g., photovoltaic cells. In some embodiments, the solar module may be used as a component in a larger photovoltaic system to offer electricity for commercial and residential applications.

Each module 201 is attached to other modules in the array using crosslinks 205. Each crosslink 205 includes a thermal growth compensator 100 of the type described herein. The crosslinks are rigidly connected, yet free to expand or contract in a direction necessary for thermal compensation. The modules 201 in the array are arranged with one edge ruling along the column (e.g., North-South) direction of the array and a perpendicular edge running along the row (e.g., East-West) direction. The crosslinks 205 are arranged at an angle transverse (e.g., at a 45 degree angle, or any other suitable angle) to the row and column directions of the array. The expansion/contraction properties of the crosslinks 205 may be chosen to oppose and balance those of the modules, thereby reducing or even eliminating thermal stress and strain over a desired temperature range (e.g., −50 C to 100 C or any subrange thereof).

In the embodiments shown, the crosslinks extend between Airy points of edges of the modules 201. As is known in the art, Airy points are the support points along a length of an object that minimize bending or droop. Airy points are arranged symmetrically around the center of the length and are separated by a distance equal to $1/\sqrt{3}$ times the total length (approximately equal to five ninths of the total length). However, in various embodiments other suitable choices of support or attachment points may be used.

The above described transverse crosslink arrangement is advantageous, as it allows each thermal growth compensator to compensate for thermal expansion of the modules along two directions, allowing for the total number of required thermal growth compensators 100 to be reduced or minimized. However, in other embodiments, different arrangements may be used. For example, FIG. 4 shows two solar modules 201 mounted using four thermal growth compensators 100. The modules 201 thermally expand and contract about their centers. Two of the four compensators 100 are arranged parallel to a first pair of module edges. The other two compensators 100 are arranged parallel to a second pair of module edges and perpendicular to the first pair of module edges. Accordingly, the compensators may compensate for module expansion and contraction along two orthogonal directions (e.g., north-south and east-west). However, compared to the transverse arrangement shown in FIG. 3, twice the number of thermal growth compensators 100 per module 201 are required.

As shown in FIG. 4, the compensators 100 are attached to the edges of the modules 201 at the Airy support points of the edges. However, in various embodiments other suitable choices of support points may be used.

FIGS. 5A and 5B show a solar module mounting system 500 for mounting and a rectangular array of solar modules 201. FIG. 5A is a top down view. FIG. 5B is a side view.

The mounting system 500 includes a plurality of support frames 501 and deflector elements 502. In the arrangement shown, the left edge of each module 201 is attached to and support by the right side of a pair of support frames 501. The right edge of each module 205 is attached to and support by the left side of a pair of support frames 501. As shown, the left and right sides of each support module are positioned at different heights above the surface on which the support frames 501 rest, thereby inclining the modules at an angle. Any angle of inclination may be chosen, including a flat (zero angle of inclination) arrangement.

Deflector elements 502 are attached to the support frames to deflect wind up and over the modules, to reduce or eliminate lifting forces caused by the movement of air under the modules.

FIG. 6A shows a detailed perspective view of the support frame 501. FIG. 6B shows a side view of the support frame 501. In the example shown, the support frame 501 includes of four tubular support members 601, 602, 603 and 604. For the sake of clarity, the support members will be referred to as the northeast member 601, the northwest member 602, the southwest member 603 and the southeast member 604. However, in various embodiments the members may be arranged along any suitable direction. Each of the members 601, 602, 603, 604 may be made of a metal tube bent into a suitable shape, e.g., aluminum or rolled steel.

The support from includes four thermal growth compensators 100 of the type described herein. Each of the compensators attaches abutting ends of pairs of the support members 601, 602, 603, 604.

Two of the four devices 100 provide compensation along the North-South (N-S) direction. One connects the northeast member 601 to the northwest member 602. The other connects the southwest member 603 to the southeast member 604.

The other two devices 100 provide compensation along the East-West (E-W) direction. One connects the northeast member 601 to the southeast member 604. The other connects the northwest member 602 to the southwest member 603. The operation of the compensators is further detailed below.

The support frame 501 may include one or more pads 610 used to contact an underlying surface. The pads may be chosen from a material, e.g., rubber, which protects the underlying surface (e.g. a building roof) from damage. In some embodiments, the support frame 501 may include one or more components (e.g., a pan) suitable for receiving the weight of a ballast material (not shown). In various embodiments, a portion of the frame 501 may be attached to or embedded in a ballast material (not shown).

In various embodiments, the support frame may include clips 620 or other attachment facilities for attaching the wind deflectors 502.

In various embodiments, the support from may be attached to one or more of the modules 201 using an attachment claw of any of the types described in the publications incorporated by reference above. In other embodiments, any other suitable attachment may be used. In some embodiments a facility is included which provides an electrical connection between the module 201 and the frame 501 to assist in grounding. In some embodiments, this electrical connection is provided directly using an attachment claw. In other embodiments, a separate connection facility may be used. In some embodiments, the electrical connection provided between the frame 501 and the attached modules 201 meets or exceeds the grounding continuity requirements set out in grounding standards known in the art, e.g., in Underwriters Laboratory standard UL2703 (available at http://ulstandardsinfonet.ul.com).

In some embodiments, the attachment between the support frame 501 and the modules 201 may be made along the edges of the modules, e.g., such that the module is supported at one or more Airy points of the edges. Such embodiments advantageously reduce or minimize stress on the module due to bending or drooping of the module between the points of support.

In some embodiments, support frame 501 (or any component thereof) may also contain one or more wire chases (not shown) that can be used for running electrical wire through the support frame. Such wire chases may provide integrated wire management and integrated grounding capabilities.

FIG. 6C shows a top down view of the support frame 501 detailing the thermal growth compensators 100. As noted above, the support frame 501 includes four thermal growth compensators 100 of the type described herein. Two of the four devices 100 provide compensation along the North-South (N-S) direction, while the other two devices 100 provide compensation along the East-West (E-W) direction. Each of the compensators is attach to the abutting ends of pairs of the support members 601, 602, 603, 604. The thermal expansion and contraction of the thermal growth compensators 100 is tuned to match but oppose the thermal expansion and contraction of the attached solar modules 201. Accordingly, the frames 501 can accommodate the thermal motion of the modules, reducing or elimination thermal stress and strain (and therefore wear and tear on the modules 201 and mounting system 500). In some embodiments, this reduces or eliminates motion of the solar module array relative to the underlying supporting surface, advantageously reducing or preventing damage to the surface.

Figure 5C:
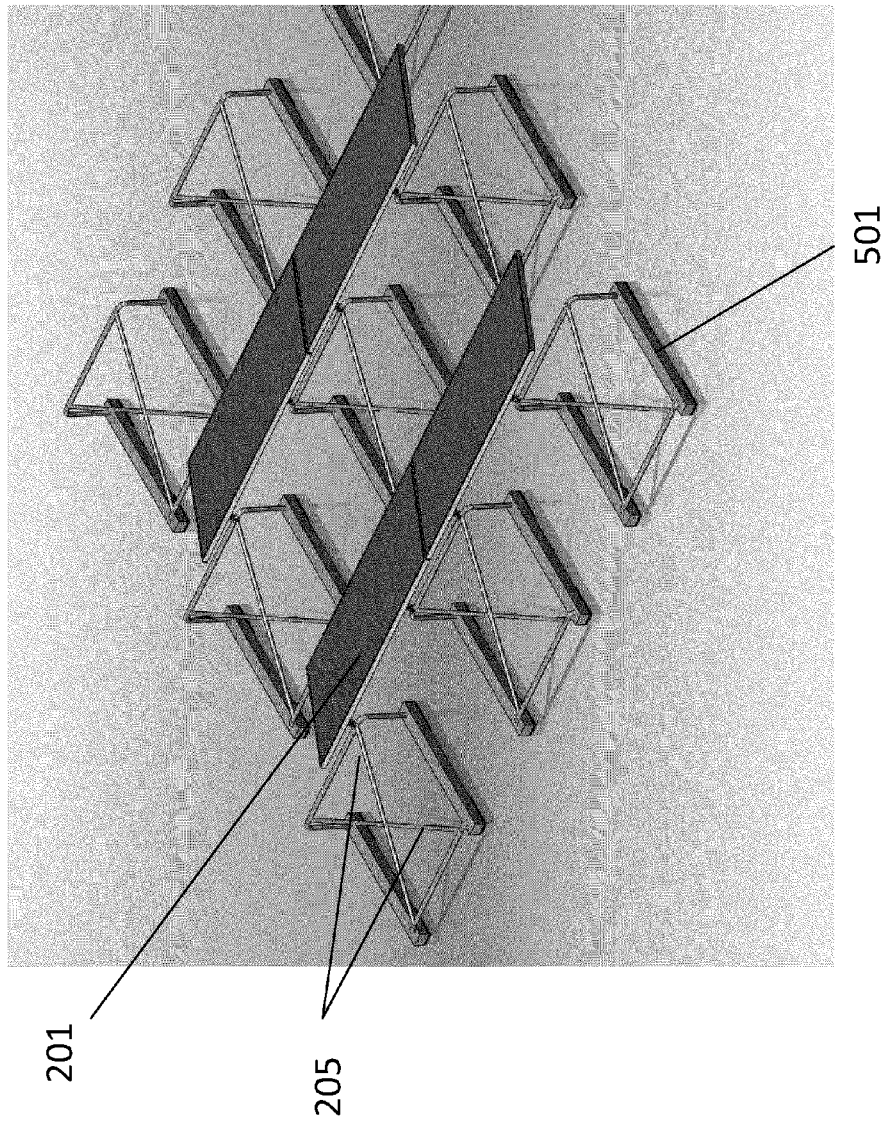
FIG. 5C shows a perspective view of a solar module mounting system featuring thermal growth compensators integrated in support frames in a transverse configuration.

FIG. 5C shows a perspective view of a solar module mounting system 500 using a transverse crosslink arrangement similar to the type shown in FIG. 3 for the support frames 501. The solar modules 201 are mounted on support frames 501, as in FIGS. 5A and 5C. However, in this embodiment, each support frame 501 includes two crosslinks 205 that are transverse to each other, and to the row and column directions of the array of modules 201. Each crosslink 205 includes a thermal growth compensator 100. Note that, advantageously, athermalization is provided using only two compensators 100 per mounting frame 100, as compared to the four compensators per fram in the embodiments shown in FIGS. 5A-5B and 6A-C.

FIG. 7A shows an exploded view of one of the thermal growth compensators 100 of the support frame 501. FIG. 7B shows a side view of the device. As shown, the thermal growth compensator 100 connects abutting ends of the support members 603 and 604, but a similar arrangement applies to other pairs of support members.

FIGS. 7C, 7D, and 7E show cross sections of the thermal growth compensator 100 at a baseline temperature (e.g., as labeled, room temperature), a temperature warmer than baseline temperature (labeled "hot"), and a temperature colder than a baseline temperature (labeled "cold"), respectively. A compensator tube 705 is made of a material with a CTE greater than that of the frame support members 603 and 604. The left end 703 of the support member 603 on the left hand side of the figures fits around the compensator tube 705, and is attached to the right hand side of the tube 705, using a rivet or any suitable attachment. A connector tube 704 has a left end that is inserted into the compensator tube 705, and attached to the left hand of the tube 703, using a rivet attachment. The right end of the connector tube 704 is connected to the support frame member 604 on the right hand side of the figure, also with a rivet connection. In various embodiments, other connection types (e.g. adhesive connections, welded connections, etc.) may be used.

As will be apparent to one skilled in the art, this configuration of thermal growth compensator 100 is substantially equivalent to that shown in, e.g., FIG. 2A, wherein element 705 corresponds to element 105, element 703 corresponds to element 103, and element 704 corresponds to element 104.

Accordingly, when the thermal growth compensator 100 is heated from baseline, it operates to move the abutting ends of the left and right support from members 603, 604 closer together (FIG. 7D). When the thermal growth compensator 100 is cooled from baseline, it operates to move abutting ends of the support members 603 and 604 farther apart (FIG. 7E). This thermal behavior operates in the opposite sense from that of the solar modules (which expand when heated and contract when cooled), thereby providing thermal compensation to athermalized the system.

In some embodiments, the thermal growth compensator 100 includes a grounding link 720 that establishes a continuous electrical connection between the abutting support frame members 603, 604. The link 720 may extend through the compensator tube 705 and connector tube 704 to establish the electrical continuity. In some embodiments, the electrical connection provided by the link 720 meets or exceeds the grounding continuity requirements set out in grounding standards known in the art, e.g., in Underwriters Laboratory standard UL 2703 (available at http://ulstandardsinfonet.ul.com). In some embodiments, the link 720 is deformable (e.g., stretchable or bendable), to accommodate the relative motion of the support frame members that it connects. Note that, although not visible in the cross section shown, the link 720 physically connects to the members 603, 604 to provide electrical connection.

By suitable choice of the materials and geometric arrangement of the thermal growth compensators 100 in the solar module mounting system 500, the system may be partially or completely athermalized. That is, the mounting system 100 may compensate for thermal expansion and contraction of the modules 201, such that the array remains in place without rotation or translation relative to its underlying surface (e.g., a roof top), while reducing or eliminating thermal stress on the modules 201. In this fashion, the thermal growth compensators 100 may be "tuned" for a particular application based on the properties of the modules (e.g., size, shape, CTE, etc.) and the module array configuration (e.g., row and column spacing, module incline angle, etc.).

Figure 8C:
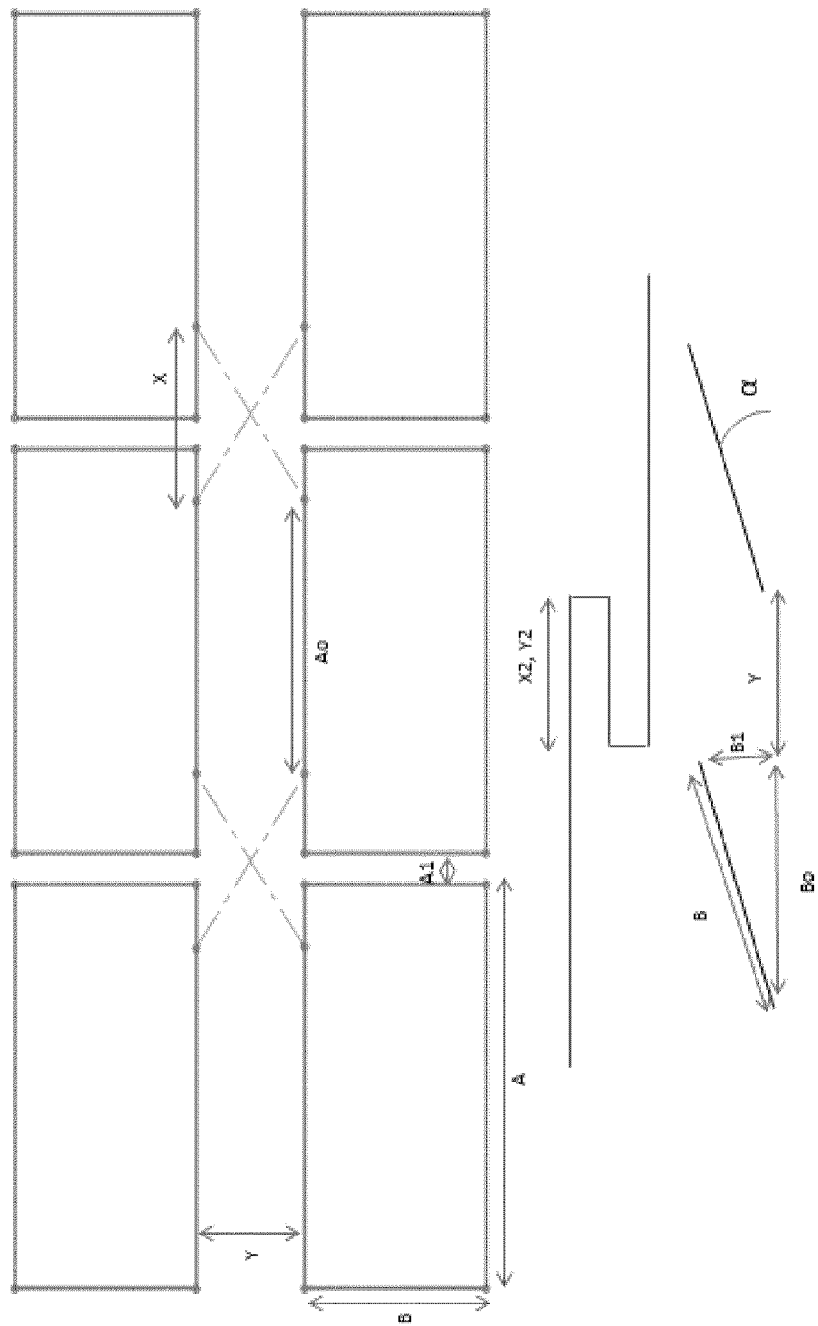

FIGS. 8A-8C illustrate a method of choosing suitable designs for the thermal growth compensators 100 in an exemplary embodiment of the mounting system 500 described above. FIG. 8A shows a table of input parameters characterizing aspects of the system 500 and the associated array of modules 201. FIG. 8B is a look up table which provides suitable design parameters for the thermal growth compensators 100 for various module sizes. FIG. 8C is a schematic illustrating the correspondence of input and output parameter labels from FIGS. 8A and 8B to aspects of the mounting system 500 and corresponding array of modules 201. For convenience, the direction from left to right in FIG. 8C (top pane) will be referred to as the E-W direction and the perpendicular direction in the page will be the N-S direction, however, in various embodiments, any suitable orientation may be used.

Referring to FIG. 8A, in a first step, a number of input parameters are collected. The parameters are as follows. CTE1 is the CTE of the support members 601, 602, 603, 604 of the support frame 501. CTE2 is the CTE of the compensator tube 705. CTEp is the CTE of the frame of the solar modules 201. $A_1$ is the gap between the modules along rows of the array (i.e., left to right in FIG. 8C, upper module). AP is related to the location of the Airy points of the modules 201 (i.e., about ⅔ of the total length of the module edge from the ends of the module edges). The SR is the shading ratio, corresponding to the ratio of the column spacing of the array of module 201 (labeled Y in FIG. 8C) to the height of the raised edge of the inclined module 201 (labeled B1 in FIG. 8C). TL and TH are the low and high temperatures in the operating temperature range of the mounting system 500. The temperature differential dT is equal to TH−TL. SL is the strain limit, corresponding to the maximum allowed strain on the modules 201 over the operating temperature range of the mounting system 500 (discussed in greater detail below).

Referring to FIG. 8B, using the input parameters, a look up table may be generated giving compensator designs for a variety of module sizes. FIG. 8C illustrates the meaning of the parameters found in the lookout table. The parameters A and B are the lengths of the modules 201 along the E-W and N-S directions, respectively. $A_0$ is the distance between Airy points along the E-W module edge. The angle of inclination of the modules 201 is $\alpha$, where sin $\alpha$ is equal to B/B1. $B_0$ is equal to B sin $\alpha$ (i.e. the length of the horizontal projection of the inclined module, as shown in FIG. 8C, lower module). X is the distance between the Airy points of adjacent modules 201 in a row of the array.

X2 gives the arrangement of the E-W aligned thermal growth compensators 100. As illustrated in FIG. 8C, middle module, X2 is the distance between the points of attachment of the support frame to the compensator tube element (compare with FIGS. 1A-1C). That is, in the embodiment shown in FIGS. 7A-7C, X2 corresponds to the distance between the point where the element 703 is attached to the compensator tube 705 and the point where the element 704 is attached to the compensator tube 705. For a given module size, X2 may be calculated as:

$$X2 = \frac{A_0 \times CTE_p + X \times CTE_1}{CTE_2 - CTE_1}.$$

Y2 is the corresponding length for the N-S aligned thermal growth compensators 100. For a given module size, Y2 may be calculated as:

$$Y2 = \frac{B_0 \times CTE_p + Y \times CTE_1}{CTE_2 - CTE_1}.$$

The values of X2 and Y2 give the attachment (e.g., rivet hole) spacings for the thermal growth compensators 100 along both N-S and E-W directions that correspond to a 0% thermal strain over the operating temperature range for the system. Note however, that there are many available unique models all having varying length and width dimensions. Thus each would require a specific compensator for each direction. To reduce the number of varying length compensators, the modules are grouped into ranges that allow for strain less than the strain limit SL (as shown 10%) for the entire solar module array and mounting system. This reduces the number of thermal compensators to, e.g., four to cover all scenarios in the given range.

As will be understood by those skilled in the art, the above described techniques may be readily adapted to provide designs for other mounting systems, e.g., the system shown in FIG. 3 above.

Figure 9C:
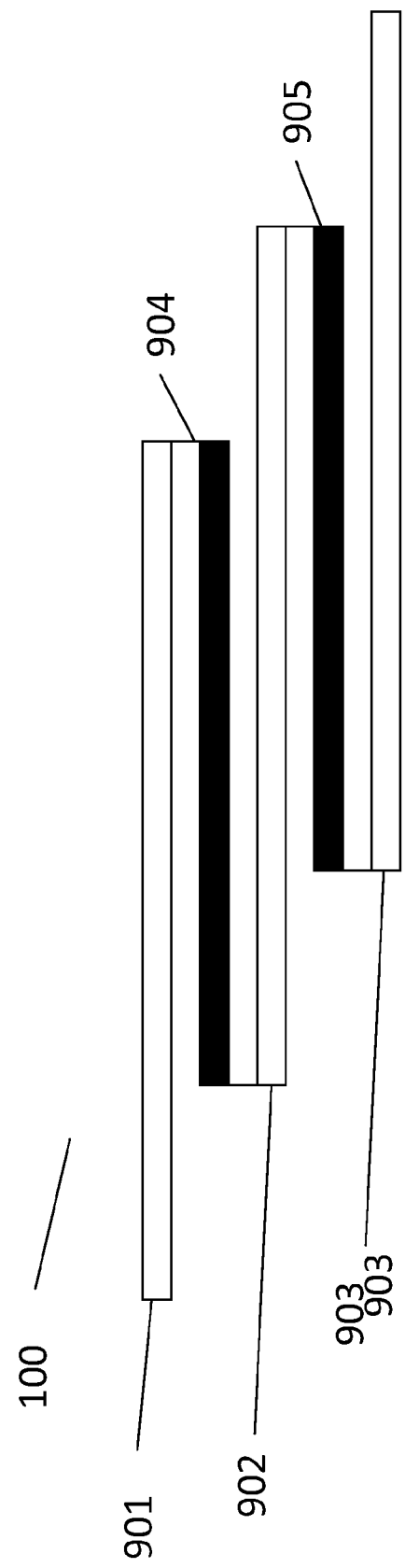
FIG. 9C is a schematic of the thermal growth compensator of FIG. 9A at a temperature colder than the baseline temperature.

As will be understood by one skilled in the art, the concepts described above may be used to produce thermal growth compensators of various configurations. FIGS. 9A, 9B, and 9C show an alternate embodiment of a thermal growth compensator 100. In this embodiment, the compensator includes first, second, and third elongated members 901, 902, 903 having a relatively low CTE. The compensator 100 also includes first and second elongated members 904, 905 having a relatively high CTE. The members are arranged in a staggered configuration that essentially repeats the configuration shown in FIGS. 1A-1C. The right ends of the first and third low CTE members 901, 903 are attached to the left ends of the first and second high CT members 904, 905, respectively. The left end of the second low CTE member 902 is attached to the left end of the first high CTE member 904. The right end of the second low CTE 902 member is attached to the right end of the second low CTE member 905.

FIG. 9A shows the compensator 100 at a baseline temperature. As shown in FIG. 9B, as the temperature increases from the baseline temperature, the first and second high CTE members 904, 905 expand more than the first, second, and third low CTE members 901, 902, and 903. The left end of the first low CTE member 901 is fixed, and so the right ends of the second and third low CTE members 902 and 903 are drawn towards the left end of the first low CTE member 901. Accordingly, the overall length of the thermal growth compensator 100 decreases as the temperature is increased from the baseline temperature.

As shown in FIG. 9C, as the temperature decreases from the baseline temperature, the first and second high CTE members 904, 905 contract more than the first second and third low CTE members 901, 902, and 903. The left end of the first low CTE member 901 is fixed, and so the right ends of the second and third low CTE members 902 and 903 move away from the left end of the first low CTE member 901. Accordingly, the overall length of the thermal growth compensator 100 increases as the temperature is decreased from the baseline temperature.

As described above, the thermal growth compensator 100 may be used to provide thermal compensation. As will be understood by those skilled in the art, the basic structure may be repeated to include any suitable number of low and high CTE members in a staggered arrangement. Notably, this repetition essentially multiplies the compensation effect of the basic unit of the arrangement. This may be useful in embodiments where the difference in CTE between the high CTE and low CTE members is not very large (e.g., where the members are made of two different metallic materials). By use of a suitable number of members, equivalent compensation can be provided to that found in a device with fewer members, but larger CTE difference.

Figure 10A:
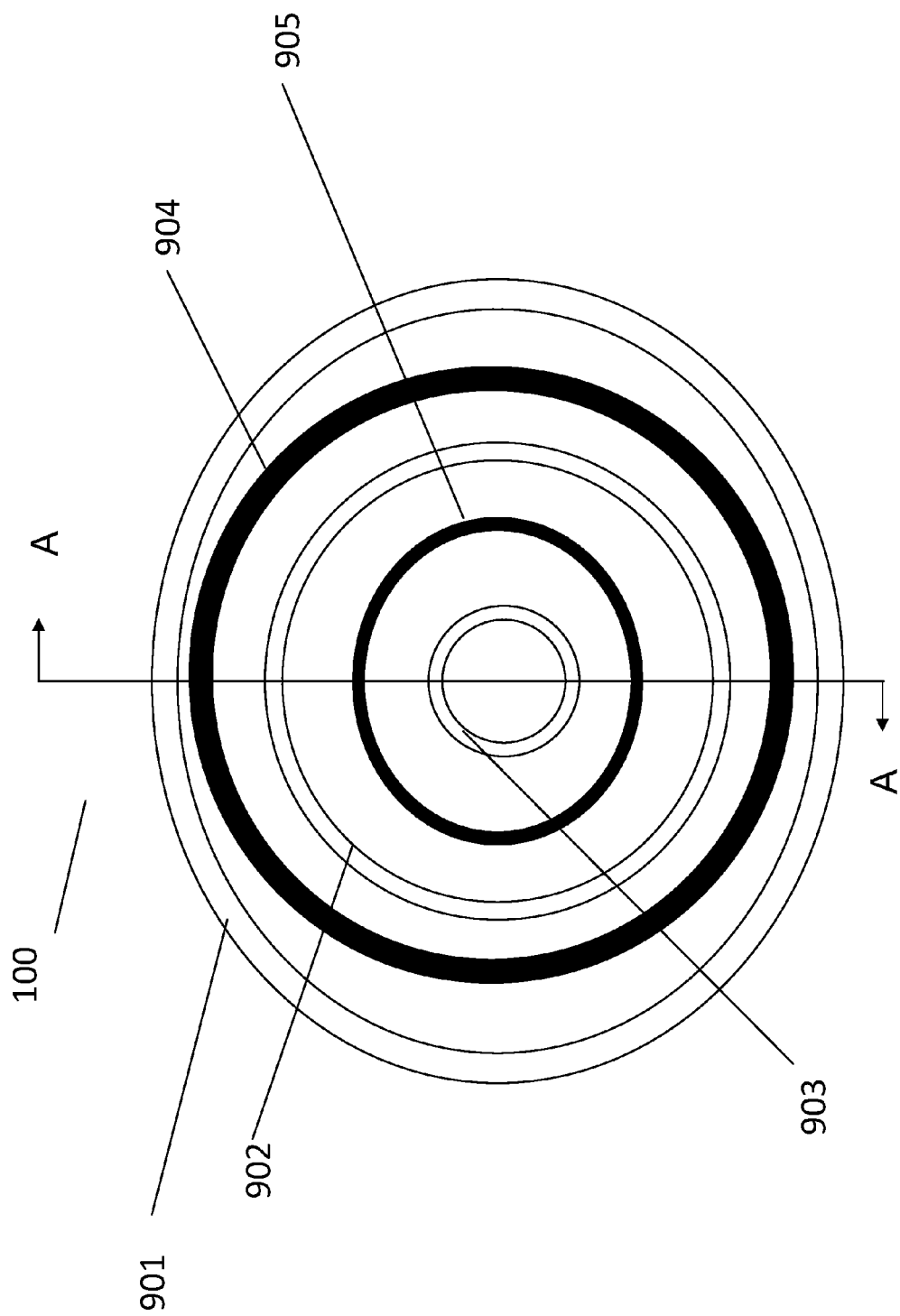
FIG. 10A is a head on view of a thermal growth compensator.
Figure 10B:
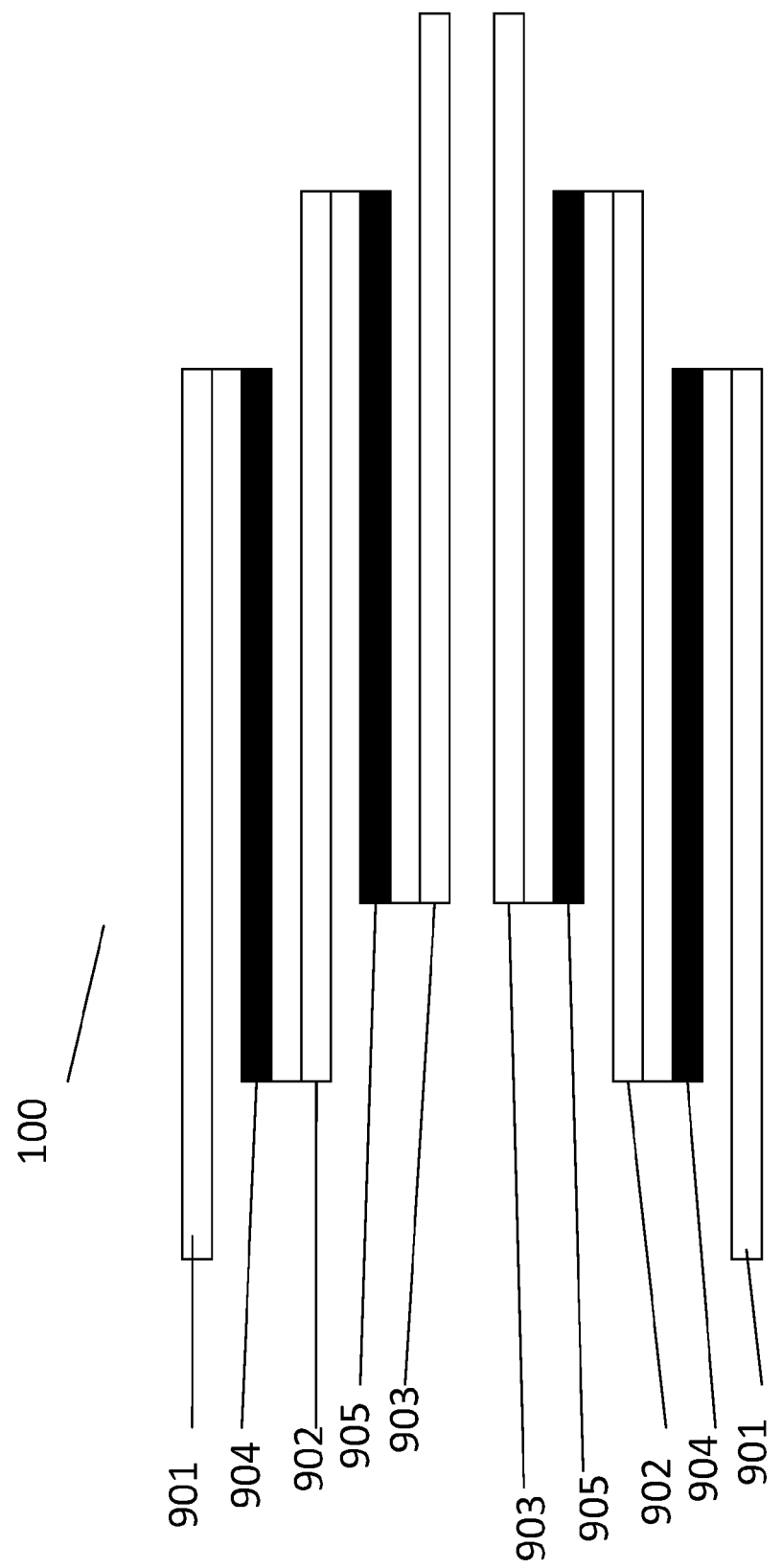
FIG. 10B is a cross sectional view of the thermal growth compensator of FIG. 10A.

In various embodiments, the members 901-905 of the thermal compensator may be of any suitable shape, e.g., rods, plates, disks, tubes, etc. For example FIGS. 10A and 10B show an embodiment of a thermal compensator 100 where the members 901-905 are concentrically disposed elongated tubular members. FIG. 10A shows a head-on view of the compensator 100. FIG. 10B shows a cross section taken along AA, as shown in FIG. 10A. A first low CTE member 901 is disposed about a second low CTE member 902. The second low CTE member 903 is disposed about a third low CTE member 903. A first high CTE member 904 is disposed in the annular space between the first and second low CTE members 901 and 902. A second high CTE member 904 is disposed in the annular space between the second and third low CTE members 902 and 903.

Again, the members 901-905 are arranged in a staggered configuration that essentially repeats the configuration shown in FIGS. 1A-1C. The right ends of the first and third low CTE members 901, 903 are attached to the left ends of the first and second high CT members 904, 905, respectively. The left end of the second low CTE member 902 is attached to the left end of the first high CTE member 904. The right end of the second low CTE 902 member is attached to the right end of the second low CTE member 905.

As the temperature increases from a baseline temperature, the first and second high CTE members 904, 905 expand more than the first, second, and third low CTE members 901, 902, and 903. The left end of the first low CTE member 901 is fixed, and so the right ends of the second and third low CTE members 902 and 903 are drawn towards the left end of the first low CTE member 901. Accordingly, the overall length of the thermal growth compensator 100 decreases as the temperature is increased from the baseline temperature.

As the temperature decreases from the baseline temperature, the first and second high CTE members 904, 905 contract more than the first second and third low CTE members 901, 902, and 903. The left end of the first low CTE member 901 is fixed, and so the right ends of the second and third low CTE members 902 and 903 move away from the left end of the first low CTE member 901. Accordingly, the overall length of the thermal growth compensator 100 increases as the temperature is decreased from the baseline temperature.

Figure 11A:
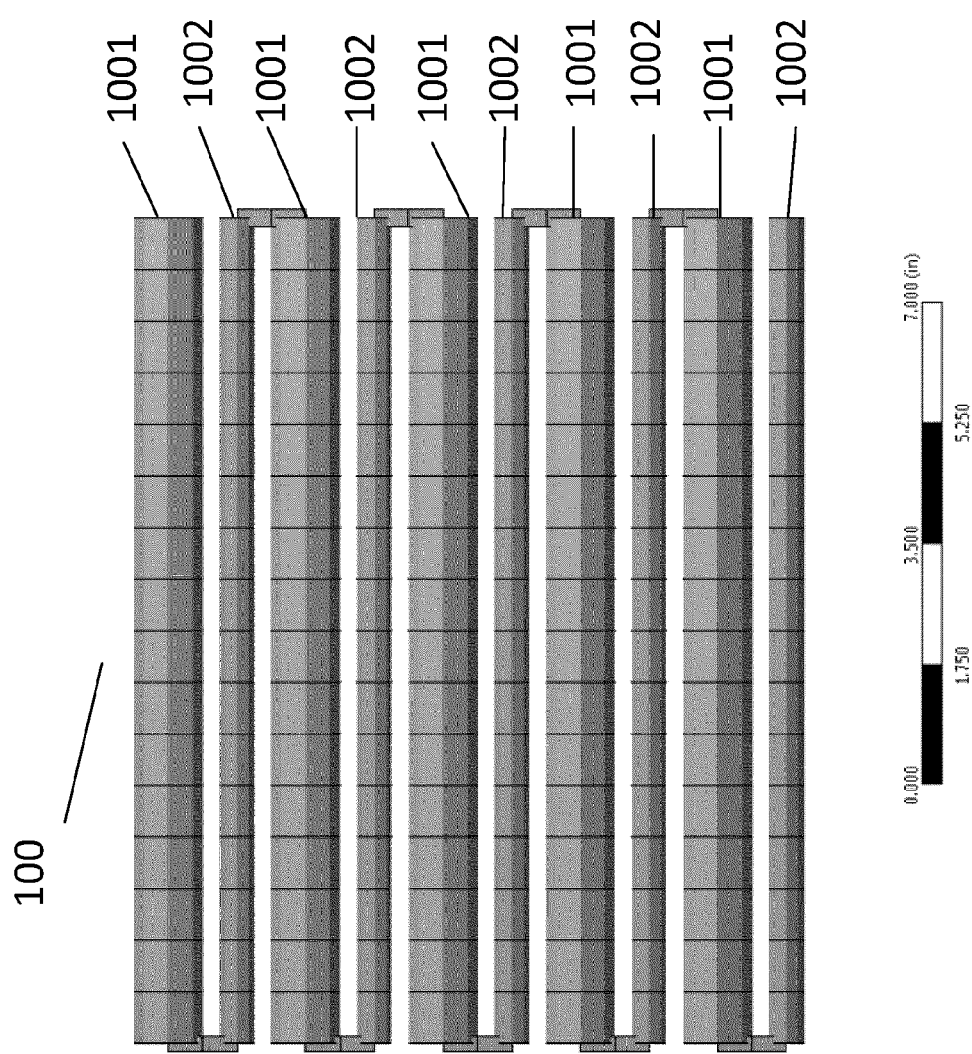
FIG. 11A is an illustration of a metallic composite thermal growth compensator.

FIG. 11A shows an illustration of an all-metal composite thermal growth compensator 100. The compensator 100 is made of five elongated members 1001 made of a first metal (e.g., stainless steel such as 416 stainless steel) having a relatively low CTE, and five elongated members 1002 made of a second metal (e.g., zinc) having a relatively high CTE. In various embodiments, any other suitable metallic materials may be used.

As in the examples provided above, the members 1001 and 1002 are arranged in an alternating fashion, with opposite ends of each pair of adjacent high and low CTE members attached to one another. As in the examples provided above, this arrangement may be used to provide thermal compensation. The members may be attached using any suitable technique, including welding, brazing, soldering, forming, gluing or adhering (e.g., using an epoxy adhesive), mechanical fastening, etc. As shown, the ten members 1001, 1002 are each twelve inches long, but any suitable, size, shape, and number of elements may be used.

Figure 11B:
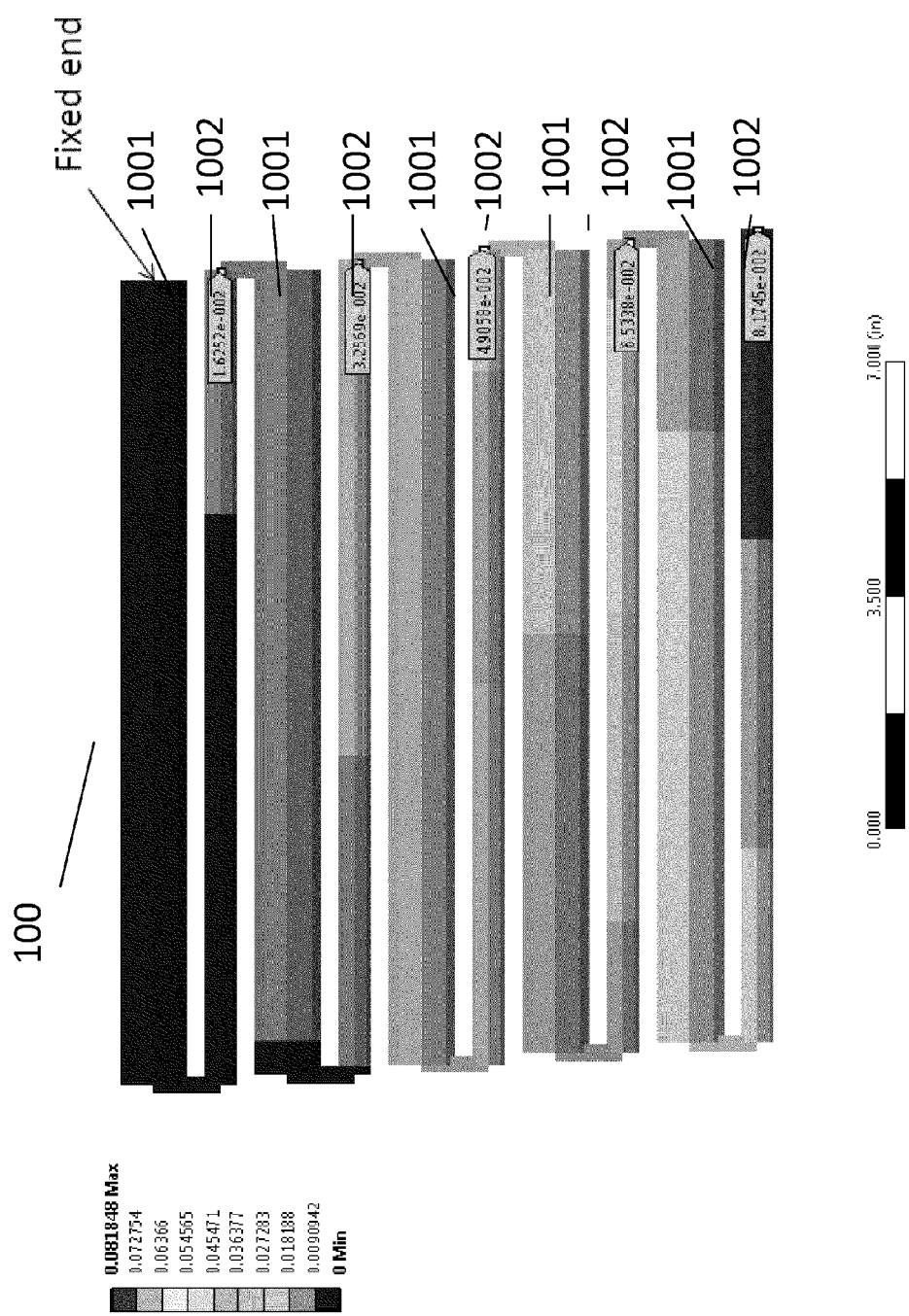
FIG. 11B is a thermal growth plow of the metallic composite thermal growth compensator of FIG. 11A.

FIG. 11B is a plot of the thermal growth of the thermal growth compensator 100 from FIG. 11A. growth is shown in arbitrary units for a temperature increase of 110° F. over a baseline temperature. The increased temperature causes the high CTE members 1001 to expand more than the low CTE members 1002. This causes the left end of the low CTE member 1001 located at the bottom of the figure to move towards the fixed right end of the low CTE member 1002 located at the bottom of the figure. The opposite would occur for a temperature decrease. Accordingly, the compensator 100 operates similarly to the compensators detailed above.

As is known in the art, metallic materials tend to have a CTE that is constant over a broad range of temperatures. Accordingly, all-metal metal embodiments of the thermal growth compensator may advantageously provide consistent compensation over a broad temperature range. This may be particularly advantageous when using the compensator 100 to athermalize a system including other metallic elements. As with the compensators described above, the all metal compensator may be tuned to have a overall CTE that is positive, negative, or zero, using a suitable choice of materials and geometry.

Further, in some applications the use of an all-metal compensator may obviate the need for a separate ground link element. All-metal compensators may also have improved rigidity in comparison to compensators featuring non-metallic (e.g., plastic) elements. In some applications all-metal compensators may bear and/or transmit a higher load than compensators featuring non-metallic (e.g., plastic) elements.

As is known in the art, metallic materials tend to have a modulus of elasticity that is relatively constant over a large temperature range, providing an additional potential advantage in comparison to compensators featuring non-metallic (e.g., plastic) elements.

Various examples have been given for devices, systems and methods for mounting solar modules. As used herein, the term solar module refers to a complete, environmentally protected unit designed to generate power when exposed to sunlight and comprising one or more solar cells and, optionally, optics and/or other components (typically exclusive of a tracker). A solar cell is a photovoltaic device that generates electricity when exposed to light. However, some embodiments may be used for mounting solar modules or arrays or solar modules, where the term solar modules refers to collection of modules mechanically fasten together, wired, and designed to provide a field-installable unit. Various embodiments may be used to mount any other suitable devices (e.g. mirrors, heat tubes, thermoelectric devices, optical devices, etc.).

It is to be noted that the above definitions of solar module, solar cell, and solar module are consistent with Article 690 of the National Electrical Code published in 2005 by the National Fire Protection Association. However, in the art, these terms are sometimes used interchangeable or imprecisely. It is to be understood that various embodiments of the devices, systems and methods described herein may be used to mount any suitable devices including solar module, solar cell, and solar module or combinations thereof.

It is to be understood that thermal grown compensators and related systems and techniques described herein may be used for thermal compensation in a variety of applications, including those outside of the field of solar module mounting. For example, thermal growth compensators of the type described herein may be incorporated in optical systems (e.g., optical mounts, cameras, telescopes, etc.). Thermal growth compensators of the type described herein may be incorporated buildings, bridges, or other structures.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system comprising:
a first plurality of elongated members, each of the first plurality of elongated members having a right end and a left end;
a second plurality of elongated members, each of the second plurality of elongated members having a right end and a left end;
wherein one or more right ends of the first plurality of elongated members are attached to one or more left ends of the second plurality of elongated members;
wherein the first plurality of elongated members has a lower coefficient of thermal expansion than a second plurality of elongated members;
wherein the first plurality of elongated members and the second plurality of elongated members comprise a tubular structure;
wherein responsive to an increase in temperature greater than a baseline temperature the one or more right ends of the first plurality of elongated members move towards the one or more left ends of the second plurality of elongated members as the first plurality of elongated members expand more than the second plurality of expanded members; and
wherein responsive to a decrease in temperature less than the baseline temperature the one or more right ends of the first plurality of elongated members move away from the one or more left ends of the second plurality of elongated members as the first plurality of elongated members contract more than the second plurality of expanded members.

2. The system of claim 1, wherein the first plurality of elongated members and the second plurality of elongated members comprise a shape of one of the following: a rod, a plate, a disk or a tube.

3. The system of claim 1, wherein right ends of a first and a third elongated member of the first plurality of elongated members are attached to left ends of a first and second elongated member of the second plurality of elongated members and a left end of a second elongated member of the first plurality of elongated members is attached to a right end of the second elongated member of the second plurality of elongated members.

4. The system of claim 3, wherein responsive to the increase in the temperature greater than the baseline temperature, the first, second, and third elongated members of the first plurality of elongated members expand more than the first and second elongated members of the second plurality of elongated members.

5. The system of claim 4, wherein an overall length of the system decreases as the temperature is increased from the baseline temperature.

6. The system of claim 3, wherein responsive to the decrease in the temperature less than the baseline temperature, the first, second, and third elongated members of the first plurality of elongated members contract more than the firstand second elongated members of the second plurality of elongated members.

7. The system of claim 6, wherein an overall length of the system increases as the temperature is decreased from the baseline temperature.

8. A system comprising:
a first plurality of elongated members, each of the first plurality of elongated members having a right end and a left end;
a second plurality of elongated members, each of the second plurality of elongated members having a right end and a left end;
wherein one or more right ends of the first plurality of elongated members are attached to one or more left ends of the second plurality of elongated members;
wherein the first plurality of elongated members is made of a first metal with a coefficient of thermal expansion lower than a that of second metal of the second plurality of elongated members;
wherein responsive to an increase in temperature greater than a baseline temperature the one or more right ends of the first plurality of elongated members move towards the one or more left ends of the second plurality of elongated members as the first plurality of elongated members expand more than the second plurality of expanded members; and
wherein responsive to a decrease in temperature less than the baseline temperature the one or more right ends of the first plurality of elongated members move away from the one or more left ends of the second plurality of elongated members as the first plurality of elongated members contract more than the second plurality of expanded members.

9. A system comprising:

a first plurality of elongated members, each of the first plurality of elongated members having a right end and a left end;

a second plurality of elongated members, each of the second plurality of elongated members having a right end and a left end;

wherein one or more right ends of the first plurality of elongated members are attached to one or more left ends of the second plurality of elongated members;

wherein the first plurality of elongated members has a lower coefficient of thermal expansion than a second plurality of elongated members;

wherein one of the first plurality of elongated members is disposed in an annular space between two of the second plurality of elongated members;

wherein responsive to an increase in temperature greater than a baseline temperature the one or more right ends of the first plurality of elongated members move towards the one or more left ends of the second plurality of elongated members as the first plurality of elongated members expand more than the second plurality of expanded members; and wherein responsive to a decrease in temperature less than the baseline temperature the one or more right ends of the first plurality of elongated members move away from the one or more left ends of the second plurality of elongated members as the first plurality of elongated members contract more than the second plurality of expanded members.

\* \* \* \* \*